United States Patent
Poirel et al.

(10) Patent No.: US 11,314,787 B2
(45) Date of Patent: Apr. 26, 2022

(54) TEMPORAL RESOLUTION OF AN ENTITY

(71) Applicant: Forcepoint, LLC, Austin, TX (US)

(72) Inventors: Christopher Poirel, Baltimore, MD (US); Russell Snyder, Baltimore, MD (US); Phillip Bracikowski, Indianapolis, IN (US); William Renner, Baltimore, MD (US)

(73) Assignee: Forcepoint, LLC, Austin, TX (US)

( * ) Notice: Subject to any disclaimer, the term of this patent is extended or adjusted under 35 U.S.C. 154(b) by 251 days.

(21) Appl. No.: 15/956,322

(22) Filed: Apr. 18, 2018

(65) Prior Publication Data

US 2019/0325061 A1 Oct. 24, 2019

(51) Int. Cl.
*G06F 16/28* (2019.01)
*G06F 16/907* (2019.01)
*G06F 16/903* (2019.01)

(52) U.S. Cl.
CPC .......... *G06F 16/288* (2019.01); *G06F 16/907* (2019.01); *G06F 16/90335* (2019.01)

(58) Field of Classification Search
CPC . G06F 16/288; G06F 16/90335; G06F 16/907
See application file for complete search history.

(56) References Cited

U.S. PATENT DOCUMENTS

| | | | |
|---|---|---|---|
| 6,072,875 A * | 6/2000 | Tsudik | H04L 63/0414 380/270 |
| 6,678,693 B1 * | 1/2004 | Shiraishi | G06F 16/288 |
| 7,107,447 B2 | 9/2006 | Sanin et al. | |
| 7,694,150 B1 | 4/2010 | Kirby | |
| 7,725,565 B2 | 5/2010 | Li et al. | |
| 7,813,944 B1 | 10/2010 | Luk et al. | |
| 7,933,960 B2 | 4/2011 | Chen et al. | |
| 8,181,253 B1 | 5/2012 | Zaitsev et al. | |
| 8,312,064 B1 | 11/2012 | Gauvin | |
| 8,424,061 B2 | 4/2013 | Rosenoer | |

(Continued)

FOREIGN PATENT DOCUMENTS

| WO | 2019153581 A1 | 8/2019 |
|---|---|---|
| WO | WO-2019153581 A1 | 8/2019 |

OTHER PUBLICATIONS

L. F. Lafuerza et al., Exact Solution of a Stochastic Protein Dynamics Model with Delayed Degradation, Phys. Rev. E 84, 051121, Nov. 18, 2011, pp. 1-8.

(Continued)

*Primary Examiner* — Neveen Abel Jalil
*Assistant Examiner* — Hubert Cheung
(74) *Attorney, Agent, or Firm* — Terrile, Cannatti & Chambers; Stephen A. Terrile

(57) ABSTRACT

A system, method, and computer-readable medium for resolving an identity of an entity, comprising parsing entity identifier information associated with the entity to provide an entity identifier element, the entity identifier information comprising temporal information; classifying the entity identifier element to provide a classified entity identifier element; normalizing the classified entity identifier element to provide a classified and normalized entity identifier element; and, associating the classified and normalized entity identifier element and the temporal information with the entity to resolve the identity of the entity at a particular point in time.

20 Claims, 14 Drawing Sheets

(56) References Cited

U.S. PATENT DOCUMENTS

| | | |
|---|---|---|
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1* | 9/2015 | Fletcher .............. G06F 16/9535 |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2* | 3/2017 | Coates .................... G06F 17/30 |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2* | 9/2017 | Bhide ................... G06F 15/173 |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1* | 6/2019 | Ahmed ............... H04L 63/1441 |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,769,908 B1 | 9/2020 | Burris et al. |
| 10,917,319 B2* | 2/2021 | Scheib .................. G06F 16/174 |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1* | 6/2005 | Rodriguez ............ G06F 16/162 |
| 2005/0198099 A1 | 9/2005 | Motsinger et al. |
| 2005/0273850 A1* | 12/2005 | Freund ................ H04L 63/0227 |
| | | 726/14 |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1* | 4/2010 | Miltonberger ........ G06Q 10/067 |
| | | 705/325 |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1* | 8/2010 | Palanisamy ............ G06F 16/31 |
| | | 707/803 |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |

(56) References Cited

U.S. PATENT DOCUMENTS

| | | | |
|---|---|---|---|
| 2016/0105334 A1* | 4/2016 | Boe | H04L 29/08072 |
| | | | 707/601 |
| 2016/0117937 A1 | 4/2016 | Penders et al. | |
| 2016/0147380 A1* | 5/2016 | Coates | G06F 16/334 |
| | | | 715/736 |
| 2016/0164922 A1 | 6/2016 | Boss et al. | |
| 2016/0224803 A1 | 8/2016 | Frank et al. | |
| 2016/0226914 A1 | 8/2016 | Doddy et al. | |
| 2016/0232353 A1 | 8/2016 | Gupta et al. | |
| 2016/0247158 A1 | 8/2016 | Kolotinsky | |
| 2016/0261621 A1 | 9/2016 | Srivastava et al. | |
| 2016/0277360 A1 | 9/2016 | Dwyier et al. | |
| 2016/0277435 A1 | 9/2016 | Salajegheh et al. | |
| 2016/0286244 A1 | 9/2016 | Chang et al. | |
| 2016/0300049 A1* | 10/2016 | Guedalia | G06F 21/316 |
| 2016/0308890 A1 | 10/2016 | Weilbacher | |
| 2016/0330219 A1 | 11/2016 | Hasan | |
| 2016/0330746 A1 | 11/2016 | Mehrabanzad et al. | |
| 2016/0335865 A1 | 11/2016 | Sayavong et al. | |
| 2016/0371489 A1 | 12/2016 | Puri et al. | |
| 2017/0032274 A1 | 2/2017 | Yu et al. | |
| 2017/0053280 A1 | 2/2017 | Lishok et al. | |
| 2017/0063888 A1 | 3/2017 | Muddu et al. | |
| 2017/0070521 A1 | 3/2017 | Bailey et al. | |
| 2017/0104790 A1 | 4/2017 | Meyers et al. | |
| 2017/0116054 A1 | 4/2017 | Boddhu et al. | |
| 2017/0155669 A1 | 6/2017 | Sudo et al. | |
| 2017/0171609 A1 | 6/2017 | Koh | |
| 2017/0230418 A1 | 8/2017 | Amar et al. | |
| 2017/0255938 A1 | 9/2017 | Biegun et al. | |
| 2017/0279616 A1 | 9/2017 | Loeb et al. | |
| 2017/0286671 A1* | 10/2017 | Chari | G06F 21/552 |
| 2017/0331828 A1 | 11/2017 | Caldera et al. | |
| 2017/0149815 A1 | 12/2017 | Bolgert | |
| 2018/0004948 A1 | 1/2018 | Martin et al. | |
| 2018/0007069 A1 | 1/2018 | Hunt et al. | |
| 2018/0018456 A1 | 1/2018 | Chen et al. | |
| 2018/0024901 A1* | 1/2018 | Tankersley | G06Q 10/06393 |
| | | | 707/694 |
| 2018/0025273 A1 | 1/2018 | Jordan et al. | |
| 2018/0027006 A1* | 1/2018 | Zimmermann | H04L 63/0245 |
| | | | 726/11 |
| 2018/0081661 A1 | 3/2018 | Gonzalez del Solar et al. | |
| 2018/0082307 A1 | 3/2018 | Ochs et al. | |
| 2018/0091520 A1 | 3/2018 | Camenisch et al. | |
| 2018/0107528 A1 | 4/2018 | Vizer et al. | |
| 2018/0121514 A1 | 5/2018 | Reisz et al. | |
| 2018/0139227 A1 | 5/2018 | Martin et al. | |
| 2018/0145995 A1 | 5/2018 | Roeh et al. | |
| 2018/0150570 A1* | 5/2018 | Broyd | G06F 16/288 |
| 2018/0191745 A1 | 7/2018 | Moradi et al. | |
| 2018/0191766 A1 | 7/2018 | Holeman et al. | |
| 2018/0191857 A1 | 7/2018 | Schooler et al. | |
| 2018/0204215 A1 | 7/2018 | Hu et al. | |
| 2018/0232111 A1* | 8/2018 | Jones | G06F 3/0482 |
| 2018/0232426 A1* | 8/2018 | Gomez | G06F 16/258 |
| 2018/0234434 A1 | 8/2018 | Viljoen | |
| 2018/0248863 A1 | 8/2018 | Kao et al. | |
| 2018/0276541 A1 | 9/2018 | Studnitzer et al. | |
| 2018/0285363 A1 | 10/2018 | Dennis et al. | |
| 2018/0288063 A1 | 10/2018 | Koottayi et al. | |
| 2018/0295141 A1 | 10/2018 | Solotorevsky | |
| 2018/0332062 A1* | 11/2018 | Ford | H04L 63/1441 |
| 2018/0336353 A1* | 11/2018 | Manadhata | G06F 16/9024 |
| 2018/0341758 A1 | 11/2018 | Park et al. | |
| 2018/0341889 A1 | 11/2018 | Psalmonds et al. | |
| 2018/0349221 A1 | 12/2018 | Harutyunyan et al. | |
| 2018/0349684 A1 | 12/2018 | Bapat et al. | |
| 2019/0014153 A1 | 1/2019 | Lang et al. | |
| 2019/0034625 A1* | 1/2019 | Ford | G06F 21/602 |
| 2019/0034813 A1 | 1/2019 | Das et al. | |
| 2019/0036969 A1 | 1/2019 | Swafford et al. | |
| 2019/0052660 A1 | 2/2019 | Cassidy et al. | |
| 2019/0095478 A1* | 3/2019 | Tankersley | G06F 16/2379 |
| 2019/0158503 A1 | 5/2019 | Bansal et al. | |
| 2019/0174319 A1 | 6/2019 | Backholm et al. | |
| 2019/0222603 A1 | 7/2019 | Yang | |
| 2019/0289021 A1* | 9/2019 | Ford | G06F 21/604 |
| 2019/0294482 A1 | 9/2019 | Li et al. | |
| 2019/0311105 A1 | 10/2019 | Better et al. | |
| 2019/0354703 A1* | 11/2019 | Ford | G06F 21/552 |
| 2019/0356688 A1* | 11/2019 | Ford | H04L 63/20 |
| 2019/0356699 A1* | 11/2019 | Ford | H04L 63/205 |
| 2019/0387002 A1* | 12/2019 | Ford | H04L 63/14 |
| 2019/0387003 A1* | 12/2019 | Ford | H04L 63/14 |
| 2019/0392419 A1 | 12/2019 | DeLuca et al. | |
| 2020/0034462 A1 | 1/2020 | Narayanaswamy et al. | |
| 2020/0036740 A1* | 1/2020 | Ford | H04L 67/22 |
| 2020/0065728 A1 | 2/2020 | Wilson et al. | |
| 2020/0077265 A1 | 3/2020 | Singh et al. | |
| 2020/0089692 A1* | 3/2020 | Tripathi | G06F 16/951 |
| 2020/0117546 A1 | 4/2020 | Wong et al. | |
| 2020/0334025 A1 | 10/2020 | Wang et al. | |

OTHER PUBLICATIONS

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

List of Patents or Applications Treated as Related, 2018.

Mesaros et al., Latent Semantic Analysis in Sound Event Detection, 19th European Signal Processing Conference (EUSIPCO 2011), pp. 1307-1311.

Marinescu, Dan C., Cloud Computing and Computer Clouds, University of Central Florida, 2012, pp. 1-246.

Yueh-Hsuan Chiang, Towards Large-Scale Temporal Entity Matching, Dissertation, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

P. Christen et al., Adaptive Temporal Entity Resolution on Dynamic Databases, Apr. 2013, http://users.cecs.anu.edu.au/~Peter.Christen/publications/christen2013pakdd-slides.pdf.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

(56) References Cited

OTHER PUBLICATIONS

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Barrere et al., Vulnerability Assessment in Autonomic Networks and Services: A Survey, IEEE, Aug. 30, 2013 vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Singh et al., Container-Based Microservice Architecture for Cloud Applications, International Conference on Computing, Communication and Automation (ICCCA2017), 2017.

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

* cited by examiner

TEMPORAL RESOLUTION OF AN ENTITY

BACKGROUND OF THE INVENTION

Field of the Invention

The present invention relates in general to the field of computers and similar technologies, and in particular to software utilized in this field. Still more particularly, it relates to a method, system and computer-usable medium for temporal resolution of an entity.

Description of the Related Art

Physical entities and individuals are typically associated with multiple identifiers, many of which may change over time. As an example, an individual usually has a last name, which is generally constant over much of an individual's lifetime. However, it is not uncommon for a last name to change at a certain date, such as when a person marries and takes the last name of their spouse. As another example, the address of a building may remain constant over its lifetime, but its name may change.

Accordingly, resolving a name identifier to an entity is generally straightforward, no matter when the resolution is performed as it does not change very often. However, computer network identifiers, such as Internet Protocol (IP) and Media Access Control (MAC) addresses, software account numbers, asset tracking numbers, and so forth, may be temporally-volatile identifiers. Consequently, resolving these changing identifiers to a given entity typically requires more information than the identifier alone due to their frequency of change.

SUMMARY OF THE INVENTION

A system, method, and computer-readable medium are disclosed for resolving an identity of an entity, comprising parsing entity identifier information associated with the entity to provide an entity identifier element, the entity identifier information comprising temporal information; classifying the entity identifier element to provide a classified entity identifier element; normalizing the classified entity identifier element to provide a classified and normalized entity identifier element; and, associating the classified and normalized entity identifier element and the temporal information with the entity to resolve the identity of the entity at a particular point in time.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
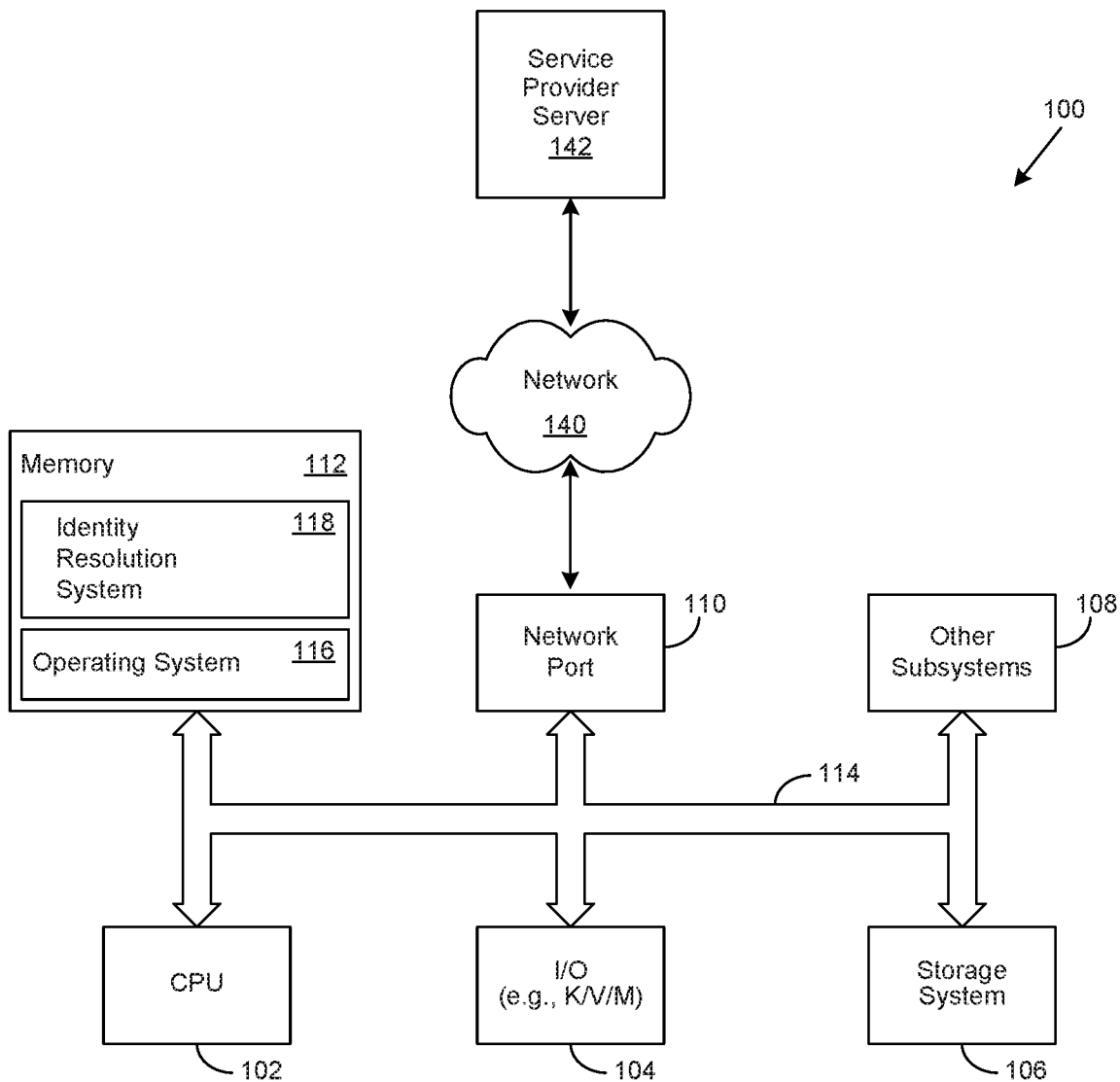
FIG. 1 depicts an exemplary client computer in which the present invention may be implemented.

A method, system and computer-usable medium are disclosed for providing real-time resolution of the identity of an entity at a particular point in time. Certain aspects of the invention reflect an appreciation that certain entity identifiers may appear the same but actually represent semantically different identifiers. Certain aspects of the invention likewise reflect an appreciation that certain entity identifiers may appear different but actually represent the same semantic identifier. For example, is entity identifier "10.0.0.1" an Internet Protocol (IP) address or an asset tracking number? The method by which that identifier may be resolved to a particular entity depends upon the answer. As another example, is "john smith <john.smith@forcepoint.com>" the same email address as "John.Smith@forcepoint.com"? The answer is yes, they are, even though they appear different because of formatting and structure differences. Accordingly, certain aspects of the invention reflect an appreciation that email-type normalization would result in the same conclusion.

Certain embodiments of the invention reflect an appreciation that there are known methods for performing "data linkage" between datasets. However, such methods are merely general approaches for matching an entity record in one data system with a record in another system. Likewise, certain embodiments of the invention reflect an appreciation that such approaches typically rely upon batch processing to join records across systems and datasets. Certain embodiments of the invention likewise reflect an appreciation that such approaches may rely upon "adaptive" algorithms or methods for "large scale" linking.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include an identity resolution system 118. In one embodiment, the information handling system 100 is able to download the identity resolution system 118 from the service provider server 142. In another embodiment, the identity resolution system 118 is provided as a service from the service provider server 142.

In various embodiments, the identity resolution system 118 performs one or more operations for providing real-time resolution of the identity of an entity at a particular point in time. In certain embodiments, the real-time resolution of the identity of an entity at a particular point in time improves processor efficiency, and thus the efficiency of the information handling system 100, by automating the providing real-time resolution of the identity of an entity at a particular point in time. As will be appreciated, once the information handling system 100 is configured to provide real-time resolution of the identity of an entity at a particular point in time, the information handling system 100 becomes a specialized computing device specifically configured to provide real-time resolution of the identity of an entity at a particular point in time and is not a general purpose computing device. Moreover, the implementation of the identity resolution system 118 on the information handling system 100 improves the functionality of the information handling system 100 and provides a useful and concrete result of automating the real-time resolution of the identity of an entity at a particular point in time.

Figure 2:
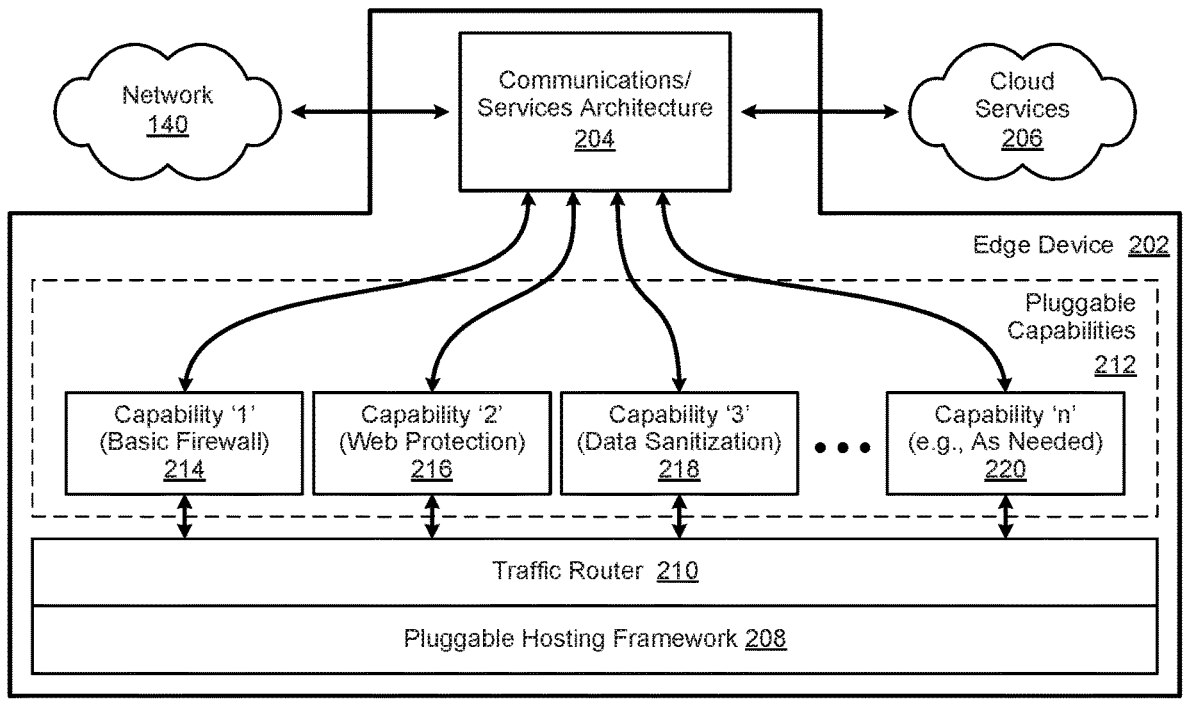
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with providing real-time resolution of the identity of an entity at a particular point in time. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
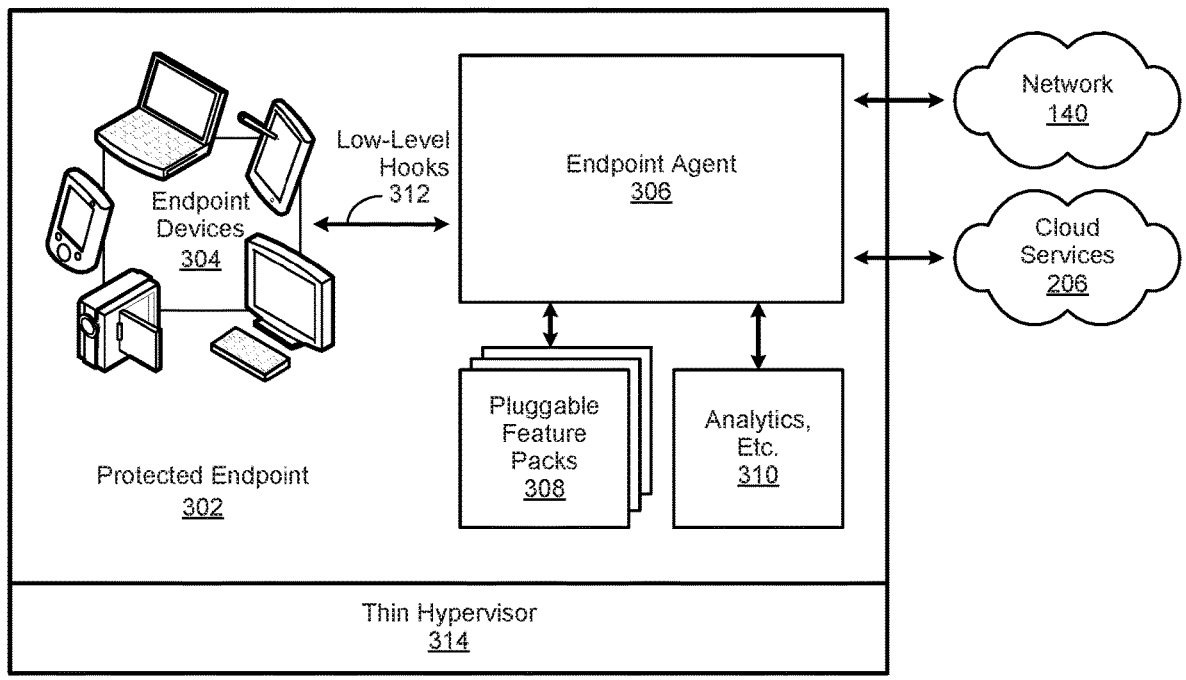
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
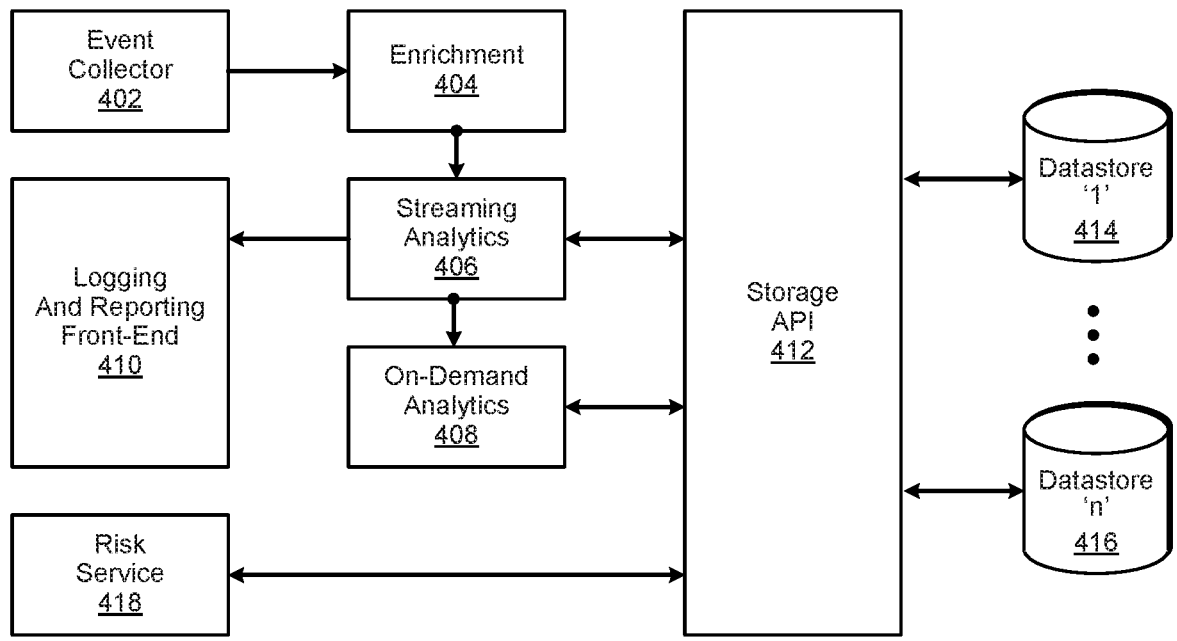
FIG. 4 is a simplified block diagram of a security analytics system.

FIG. 4 is a simplified block diagram of a security analytics system implemented in accordance with an embodiment of the invention. In certain embodiments, the security analytics system shown in FIG. 4 may be implemented to provide log storage, reporting, and analytics capable of performing streaming 406 and on-demand 408 analytics operations. In certain embodiments, such operations may be associated with providing real-time resolution of the identity of an entity at a particular point in time, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular time period or at a particular point in time, may represent suspicious user behavior.

In certain embodiments, the security analytics system may be implemented to be scalable. In one embodiment, the security analytics system may be implemented in a centralized location, such as a corporate data center. In this embodiment, additional resources may be added to the security analytics system as needs grow. In another embodiment, the security analytics system may be implemented as a distributed system. In this embodiment, the security analytics system may span multiple information processing systems. In yet another embodiment, the security analytics system may be implemented in a cloud environment. In yet still another embodiment, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received.

In one embodiment, the on-demand 408 analytics may be performed on enriched user behavior associated with a particular interval of, or point in, time. In another embodiment, the streaming 406 or on-demand 408 analytics may be performed on enriched user behavior associated with a particular user, group of users, one or more entities, or a combination thereof. In yet another embodiment, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with providing real-time resolution of the identity of an entity at a particular point in time, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
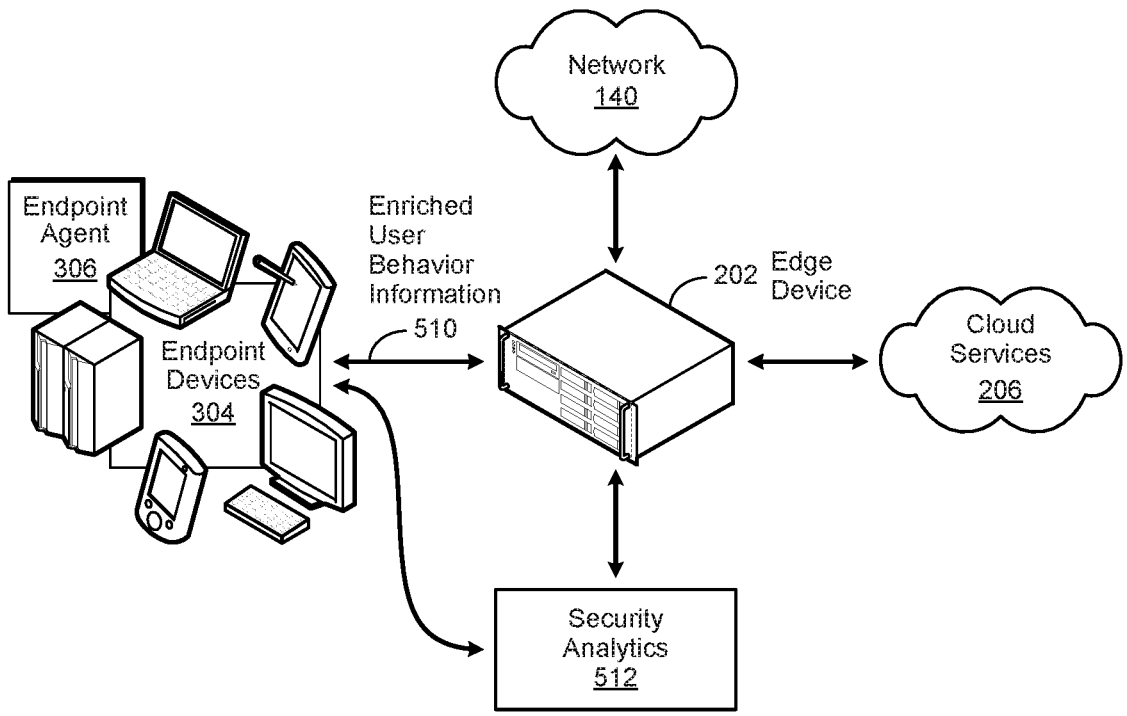
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated with providing real-time resolution of the identity of an entity at a particular point in time. In certain embodiments, the security analytics system 512 may be implemented in combination with one or more endpoint agents 306, one or more edge devices 202, cloud services 206, and a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with providing real-time resolution of the identity of an entity at a particular point in time.

In certain embodiments, the security analytics system 512 may be implemented in different operational configurations. In one embodiment, the security analytics system 512 may be implemented by using the endpoint agent 306. In another embodiment, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 512 may be implemented to allow the risk-adaptive behavior system to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the risk-adaptive behavior system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
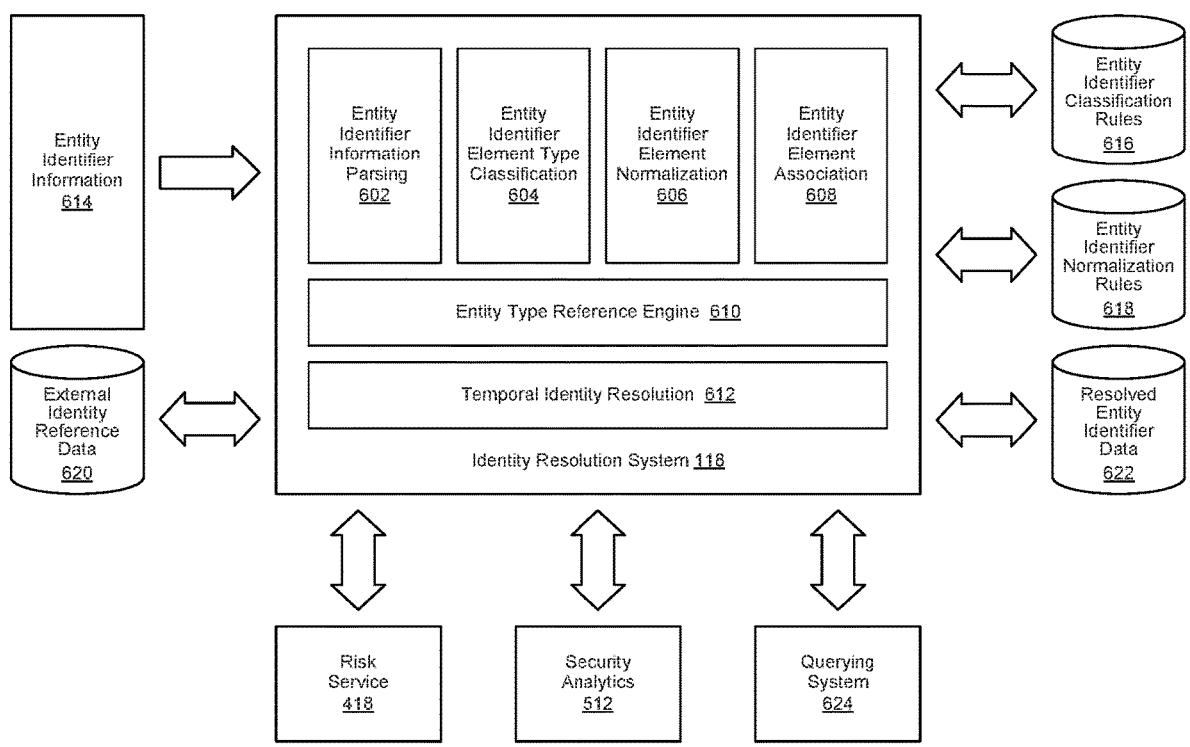
FIG. 6 is a simplified block diagram of an identity resolution system.

FIG. 6 is a simplified block diagram of an identity resolution system implemented in accordance with an embodiment of the invention. In certain embodiments, the identity resolution system 118 may be implemented to process entity identifier information 614, described in greater detail herein, to resolve the identity of an entity at a particular point in time. In certain embodiments, the entity identifier information 614 may include temporal information, described in greater detail herein. In certain embodiments, the identity resolution system 118 may likewise be implemented to perform entity resolution operations. As used herein, entity resolution operations broadly refer to operations associated with parsing, classifying and normalizing entity identifiers to generate entity identifier elements, which in turn are matched, or resolved, to a particular entity.

In certain embodiments, the performance of various entity resolution operations may result in new entity identifier elements being resolved to an existing, or previously-identified entity. In certain embodiments, the performance of various entity resolution operations may result in the creation of a previously-unknown or previously-unidentified entity. In these embodiments, the new entity identifier elements may be resolved to the newly-created entity. In certain embodiments, the entity identifier elements, and resolution data related to their association with a particular entity, may be stored in a repository of resolved entity identifier data 622, as shown in FIG. 6.

In certain embodiments, the identity resolution system 118 may be implemented to include an entity identifier information parsing module 602. In certain embodiments, the entity identifier information parsing module 602 may be used to generate entity identifier elements, described in greater detail herein, from entity identifier information 614. As an example, the entity identifier information may contain text stating, "John Smith was the VP of Sales for NewCo from May 9, 2016 through Jun. 15, 2017, at which time Bob Jones assumed the position, which he held until Nov. 20, 2017." In this example, the resulting entity identifier elements may include "John Smith," "Bob Jones," "VP of Sales," "NewCo," "May 9, 2016," "Jun. 15, 2017," and "Nov. 20, 2017." As another example, a data record associated with a package delivery may include a delimited string of data such as, "Rob Adams, NewCo, 30.648748, -97.687856, John Smith, 02.17.2018, 2:03." In this example, the resulting entity identifier elements may include "Rob Adams," "NewCo," "30.648748," "-97.687856," "John Smith," "02.17.2017," and "2:03."

As yet another example, the entity identifier information may include an email address, such as "John Smith <john.smith@newco.com>". In this example, the resulting entity identifier elements may include "John Smith," "john.smith," and "newco.com." As yet still another example, the entity identifier information may include a timestamped log of a file download from a particular datastore, such as "jsmith, abc123!, salesleads.xls, 2017.04.04, 16:33:24:45." In this embodiment, the resulting entity identifier elements may include "jsmith," "abc123!," "salesleads.xls," "2017.04.04," and "16:33:24:45."

In certain embodiments, the identity resolution system 118 may be implemented to include an entity identifier element type classification module 604 and an entity type reference engine 610. As used herein, an entity identifier element type broadly refers to a representation of a particular attribute associated with an entity identity element. In certain embodiments, the entity identifier element type classification module 604 may be implemented to use the entity type reference engine 610 to assign an entity identifier element type to each entity identifier element generated by the entity identifier information parsing module 602. In certain embodiments, the entity type reference engine 610 may be implemented to use a repository of entity identifier classification rules 616 to assign an entity identifier element type to each entity identifier element.

Using the prior examples to illustrate the use of the entity identifier element type classification module 604, the entity identifier elements "John Smith," "Bob Jones," and "Rob Adams" may each be recognized as a person's name. Accordingly, they may have a "name" entity identifier element type assigned to them. Likewise, the entity identifier elements "john.smith" and "jsmith" may be respectively recognized as an email address name and a user ID. Accordingly, they may respectively be assigned "email name" and "user name" entity identifier element types.

To continue using the prior examples, the entity identifier elements "VP of Sales" and "NewCo" may be respectively recognized as a person's title and the name of a company, while "newco.com" may be recognized as a domain name. Accordingly, they may respectively be assigned "title," "company," and "domain" entity identifier element types. Likewise, the entity identifier elements of "May 9, 2016," "Jun. 15, 2017," "Nov. 20, 2017," "02.17.2018," "2017.04.04," may all be recognized as dates in different formats, while "2:03" and "16:33:24:45" may both be recognized as timestamps. Accordingly, they may respectively be assigned "date" and "time" entity identifier element types.

To further continue using the prior examples, the entity identifier elements of "30.648748" and "-97.687856" may be recognized as Global Positioning System (GPS) coordinates. Accordingly, they may be assigned an entity identifier element type of "GPS." Likewise, the entity identifier elements of "abc123!" and "salesleads.xls" may respectively be recognized as a password and a file name. Accordingly they may respectively be assigned entity identifier element types of "password" and "file name."

In certain embodiments, the identity resolution system 118 may be implemented to include an entity identifier element normalization module 606. In certain embodiments, the entity identifier element normalization module 606 may be implemented to normalize entity identifier elements generated by the entity identifier element type classification module 604. In certain embodiments, the entity identifier element normalization module 606 may be implemented to use rules stored in a repository of entity identifier normalization rules 618 to normalize an entity identifier element.

In certain embodiments, the entity identifier element normalization module 606 may be implemented to generate type-dependent normalized entity identifier elements. As an example, an entity identifier element may be classified as an email entity identifier type. However, the entity identifier element may be further classified to be a Simple Mail Transport Protocol (SMTP) or Microsoft® Exchange® email address. Accordingly, in certain embodiments, the classified entity identifier element may be respectively processed to generate a type-dependent normalized entity identifier element according to whether it is an SMTP or Exchange® email address. In certain embodiments, the normalization operations performed by the entity identifier element normalization module 606 may result in an inferred relationship between two or more entity identifier elements, as described in greater detail herein.

Using the prior examples to illustrate the use of the entity identifier element normalization module 606, the entity identifier elements of "May 9, 2016," "Jun. 15, 2017," "Nov. 20, 2017," "02.17.2018," and "2017.04.04" may all be assigned an entity identifier type of "date," yet they do not share a consistent format. Accordingly, they may respectively be normalized by the entity identifier element normalization module 606 into a common format, such as "2016.05.09," "2017.06.15," "2017.11.20," "02.17.2018," and "2017.04.04." Likewise, the entity identifier elements of "2:03" and "16:33:24:45" may both be assigned an entity identifier type of "time," yet they do not share the same format. Accordingly, they may respectively be normalized by the entity identifier element normalization module 606 into a common format, such as "02:03:00:00" and "16:33:24:45."

In continuing to use the prior examples to illustrate the use of the entity identifier element normalization module 606, the entity identifier information 614 may have contained an email address of "John Smith <john.smith@newco.com>". In the prior example, the resulting entity identifier elements included "John Smith," "john.smith," and "newco.com." Likewise, the entity identifier elements of "john.smith," and "newco.com" were respectively assigned entity identifier types of "email name" and "domain." Accordingly, the original email address of "John Smith <john.smith@newco.com>" may be normalized into a uniform format, such as "john.smith@newco.com."

In certain embodiments, the entity identifier element normalization module 606 may be implemented to normalize a variety of entity identifier information, such as user authentication factors, user identity factors, location data, information associated with various endpoint and edge devices, internal and external network addresses, resource entities, or a combination thereof. Skilled practitioners of the art will recognize that many such embodiments are possible. Accordingly, the foregoing is not intended to limit the spirit, scope or intent of the invention.

In certain embodiments, the identity resolution system 118 may be implemented to include an entity identifier element association module 608. In certain embodiments, the entity identifier element association module 608 may be implemented to associate related entity identifier elements that have respectively been classified and normalized by the entity identifier element type classification module 604 and the entity identifier element normalization module 606. In various embodiments, the entity identifier element association module 608 may be implemented to associate certain temporal information with a classified or normalized entity identifier element.

In certain embodiments, the temporal information may include the time at which related entity identifier elements that have respectively been classified and normalized by the entity identifier element type classification module 604 and the entity identifier element normalization module 606. In certain embodiments, the temporal information may include the time at which a normalized entity identifier has been matched, or resolved, to a particular entity. In certain embodiments, the association operations performed by the entity identifier element association module 608 may result in the classified and normalized entity identifier elements to be cross-referenced to one another or otherwise indexed.

In various embodiments, the association operations performed by the entity identifier element association module 608 may result in the cross-referencing, or indexing, of classified and normalized entity identifier elements that were not originally related to one another. To continue using the prior examples to illustrate such cross-referencing, the entity identifier elements "John Smith," "VP of Sales," "NewCo," "2016.05.09," "2017.06.15," "john.smith," "newco.com" "jsmith," and "abc123!" may have been parsed, classified and normalized from different sets of entity identifier information 614. However, they are all related to one another. Accordingly, they may be cross-referenced, or otherwise indexed, to create a unified data record, such as "John Smith, VP of Sales, Newco, john.smith@newco.com, jsmith, abc123!, 2016.05.09, 2017.06.15." In certain embodiments, the entity identifier element association module 608 may be implemented to store such cross-referenced, or otherwise indexed, entity identifier data elements in a repository of resolved entity identifier data 622.

In certain embodiments, the identity resolution system 118 may be implemented to include a temporal identity resolution module 612. In certain embodiments, the temporal identity resolution module 612 may be implemented to resolve the identity of an entity at a particular point in time. In certain embodiments, the identity resolution module 612 may be implemented to perform such resolution by comparing a particular set of entity identifier information 614 to certain entity identifier data elements stored in a repository of resolved entity identifier data 622. In certain embodiments, the identity resolution module 612 may be implemented to infer a period of time by calculating the interval between two particular points in time.

In continuing to use the prior examples to illustrate the use of the entity identifier resolution module 612, the entity identifier information 614 may include certain information related to an entity claiming to be John Smith, a VP of Sales at NewCo, on Jun. 1, 2017. By accessing entity identifier data elements stored in a repository of resolved entity identifier data 622, the entity identifier resolution module 612 may be able to retrieve information related to John Smith at that point in time. For example, a unified data record, such as "John Smith, VP of Sales, Newco, john.smith@newco.com, jsmith, abc123!, 2016.05.09, 2017.06.15" may be retrieved. In this example, the data record verifies the fact that John Smith was a VP of Sales for Newco prior to the date of Jun. 15, 2017. Furthermore, John Smith's identity can be verified according to his email address of "john.smith@newco.com" and his valid user ID of "jsmith" and password of "abc123!."

In certain embodiments, the set of entity identifier information 614 may be received in real-time. In certain embodiments the resolution of the identity of an entity may be performed in real-time. In certain embodiments, the temporal identity resolution module 612 may be implemented to use external identity reference data 629 to resolve the identity of an entity. In certain embodiments, the temporal identity resolution module 612 may be implemented to use external identity reference data 629 in combination with certain entity identifier data elements store in a repository of resolved entity identifier data 622 to resolve the identity of an entity.

In certain embodiments, the identity resolution system 118 may be implemented to perform entity querying operations. As used herein, entity querying operations broadly refer to operations associated with parsing, classifying and normalizing entity identifiers to generate entity identifier elements, which are in turn processed to identify, or resolve, a corresponding entity. In certain embodiments, the identification, or resolution, of the entity is performed by using the entity identifier elements to query a repository of resolved entity identifier data 622. In certain embodiments, performance of the entity querying operations may result in the identification of additional entity identifier elements associated with the identified, or resolved, entity. In certain embodiments, such additional entity identifier elements may be returned as a result of performing the entity querying operations.

In certain embodiments, the entity querying operations may be performed in response to receiving a query from a risk service 418, described in greater detail herein. In certain embodiments, the entity querying operations may be performed in response to receiving a query from a security analytics 512 system or service, likewise described in greater detail herein. In certain embodiments, the entity querying operations may be performed in response to receiving a query from a querying system 624. In these embodiments, the querying system 624 selected to submit a query for resolved entity identifier data 622 to the identity resolution system 118 is a matter of design choice.

In certain embodiments, the entity identifiers returned as a result of the entity querying operations may be used in combination with other data to perform various security analysis operations. In certain embodiments, such security analysis operations may be performed by the risk service 418, the security analytics 512 system or service, the querying system 624, or combination thereof. Skilled practitioners of the art will appreciate that such security analysis operations will likely be more useful and accurate when aggregated by a particular entity instead of by various entity identifiers. Those of skill in the art will likewise recognize that many such embodiments are possible. Accordingly, the foregoing is not intended to limit the spirit, scope or intent of the invention.

Figure 7:
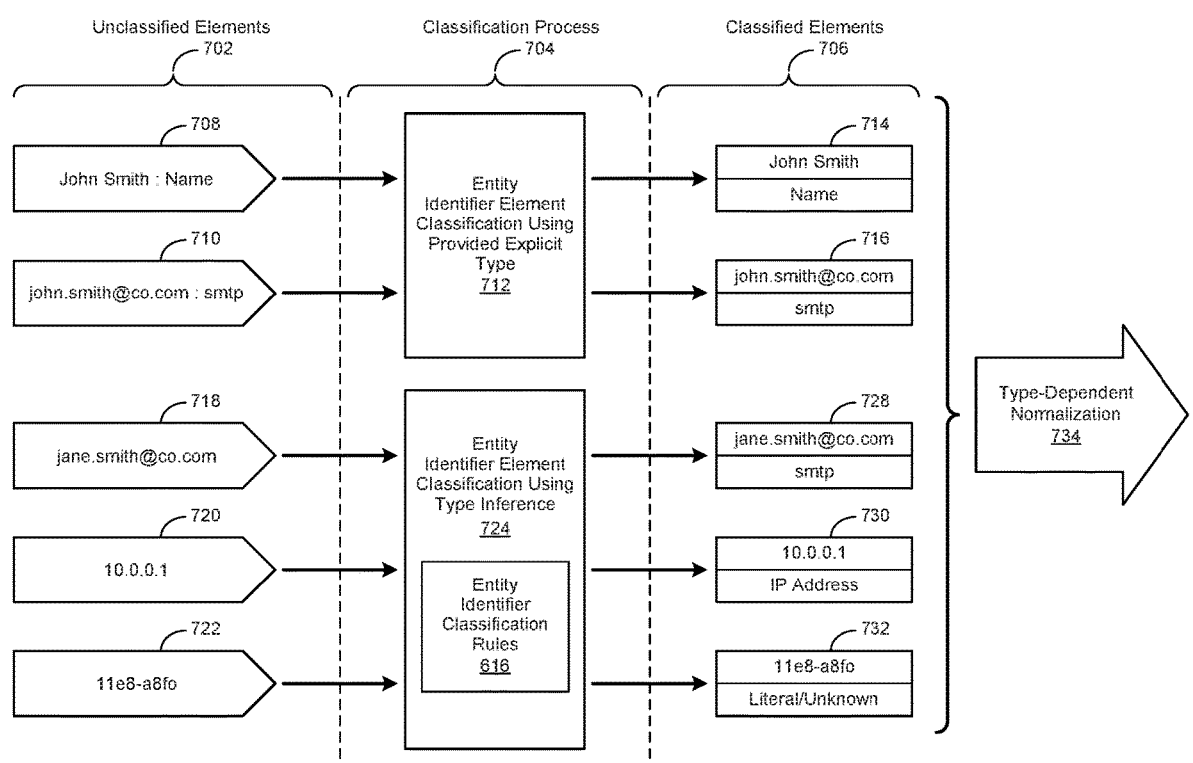
FIG. 7 is a simplified block diagram of the performance of entity identifier classification operations.

FIG. 7 is a simplified block diagram of entity identifier classification operations performed in accordance with an embodiment of the invention. In certain embodiments, entity identifier information is parsed, as described in greater detail herein, to generate unclassified 702 entity identifier elements. In certain embodiments, a classification process 704 may be implemented to generate classified 706 entity identifier elements from such unclassified 702 entity identifier elements. In certain embodiments, type-dependent normalization 734 operations, as described in greater detail herein, are then performed on the resulting classified 706 entity identifier elements.

In certain embodiments, the classification process 704 may be implemented to classify a particular entity identifier element according to a provided explicit type 712. In certain embodiments, the explicit type 712 of an unclassified entity identifier 702 may be provided by an external system. In certain embodiments, the explicit type 712 of an entity identifier element may be unequivocally denoted. In certain embodiments, the unclassified entity identifier 702 may have an explicit type 712 appended to its associated particular value. As an example, as shown in FIG. 7, a first 708 unclassified entity identifier element of "John Smith" may have a provided explicit type of "Name," while a second 710 unclassified entity identifier element of "john.smith@co.com" may have a provided explicit type of "smtp."

In this example, the first 708 and second 710 unclassified entity identifier elements are processed with their associated explicit types 712 to respectively generate a first 714 and second 716 classified entity identifier element. Accordingly, the resulting first 714 classified identifier element has a value of "John Smith" with an associated type of "Name." Likewise, the resulting second 716 classified identifier element has a value of "john.smith@co.com" with an associated type of "smtp."

In certain embodiments, the classification process 704 may be implemented to use type inference 724 to classify a particular entity identifier element. In certain embodiments, the classification process 704 of an entity identifier element through type inference 724 may be implemented to use various entity identifier classification rules 616. As an example, as shown in FIG. 7, a third 718, fourth 720, and fifth 722 unclassified entity identifier element may respectively have a value of jane.smith@co.com, "10.0.0.1," and "11e8-a8fo."

In this example, the third 718, fourth 720, and fifth 722 unclassified entity identifier elements are classified 704 using type inference 724 to respectively generate a third 728, fourth 730, and fifth 732 classified entity identifier element. Accordingly, the resulting third 728 classified identifier element has a value of "jane.smith@co.com" with an associated type of "smtp," while the resulting fourth 730 classified identifier element has a value of "10.0.0.1" with an associated type of "IP Address." Likewise, the resulting fifth 732 classified identifier element has a value of "11e8-a8fo," with an associated type of "Literal/Unknown."

To continue the example, the entity identifier classification rules 616 may include a rule stating an unclassified entity identifier element 702 containing two names separated by a period, which are then followed by an ampersand symbol, which is in turn followed by an alphanumeric string, which is then followed by a period and a domain extension, is likely an email address. Likewise, the entity identifier classification rules 616 may include a rule stating that an unclassified entity identifier element 702 containing four numbers, each of which is three digits or less and separated by a period, is likely an IP address. Skilled practitioners of the art will recognize that many such examples of entity identifier element classification processes 704, and associated classification rules 724, are possible. Accordingly, the foregoing is not intended to limit the spirit, scope or intent of the invention.

Figure 8:
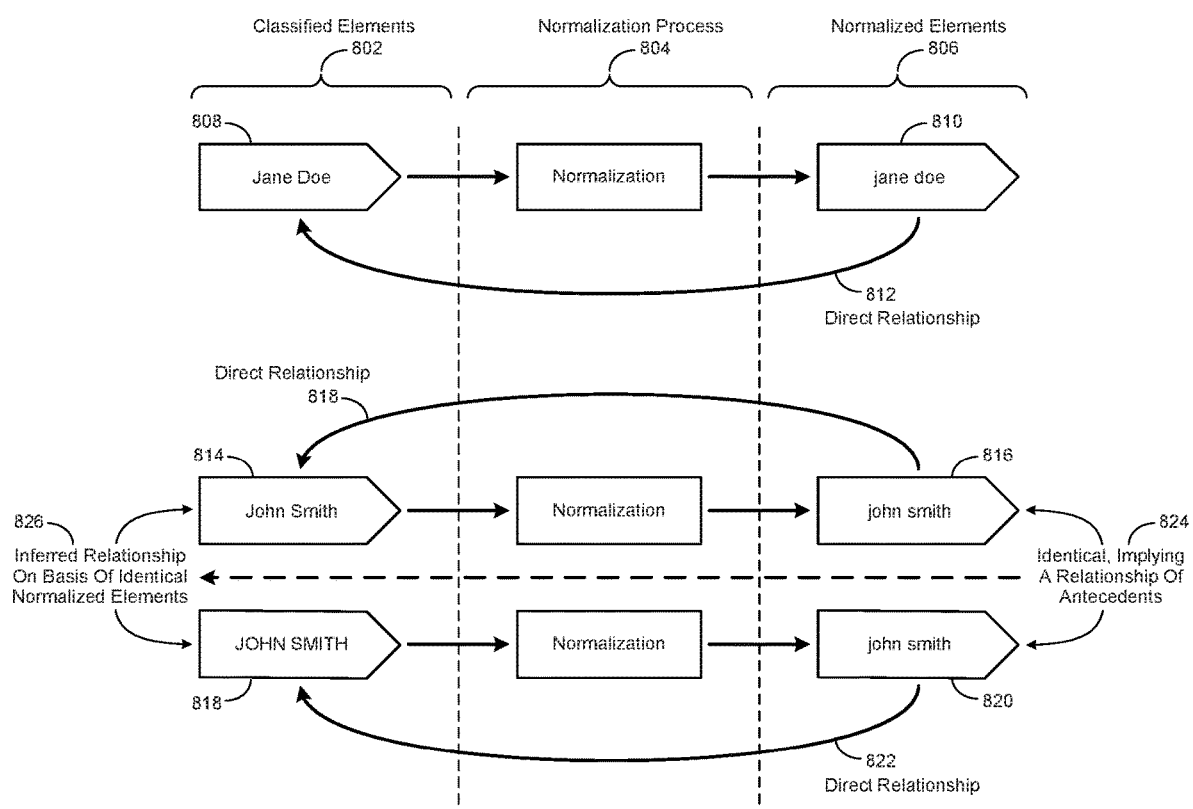
FIG. 8 is a simplified block diagram of the performance of entity identifier normalization operations.

FIG. 8 is a simplified block diagram of entity identifier normalization operations performed in accordance with an embodiment of the invention. In certain embodiments, a normalization process 804 may be implemented to generate normalized 806 entity identifier elements from classified 802 entity identifier elements. In certain embodiments, a resulting normalized 806 entity identifier element may not have an exact match in a repository of resolved entity identifier data, described in greater detail herein. Accordingly, it may be difficult to establish a relationship with other classified 802 entity identifier elements.

As an example, a normalization process 804 may be performed on a first 808 classified entity identifier element having a value of "Jane Doe" to generate a first 810 normalized entity identifier element with a value of "jane doe." Accordingly, a direct relationship 812 can be established between the first 810 normalized entity identifier element and the first 808 classified entity identifier element. However, it may be difficult to establish a relationship between the first 810 normalized entity identifier element and other classified 802 entity identifier elements if it is the only such normalized 806 entity identifier element present in a repository of resolved entity identifier data.

In certain embodiments, a resulting normalized 806 entity identifier element may have an exact match in a repository of resolved entity identifier data. As an example, a normalization process 804 may be performed on a second 814 classified entity identifier element having a value of "John Smith" to generate a second 816 normalized entity identifier element with a value of "john smith." Accordingly, a direct relationship 818 can be established between the second 816 normalized entity identifier element and the second 814 classified entity identifier element.

Likewise, a normalization process 804 may be performed on a third 818 classified entity identifier element having a value of "JOHN SMITH" to generate a third 820 normalized entity identifier element with a value of "john smith." Accordingly, a direct relationship 822 can be established between the third 824 normalized entity identifier element and the third 818 classified entity identifier element. To continue the example, both the second 816 and third 820 normalized entity identifier elements have the same value of "john smith," which implies 824 a relationship of antecedents. Consequently, an inferred 826 relationship can be established between the second 816 and third 820 normalized entity identifier elements, based upon their identical values, and second 814 and third 818 classified entity identifier elements.

Figure 9:
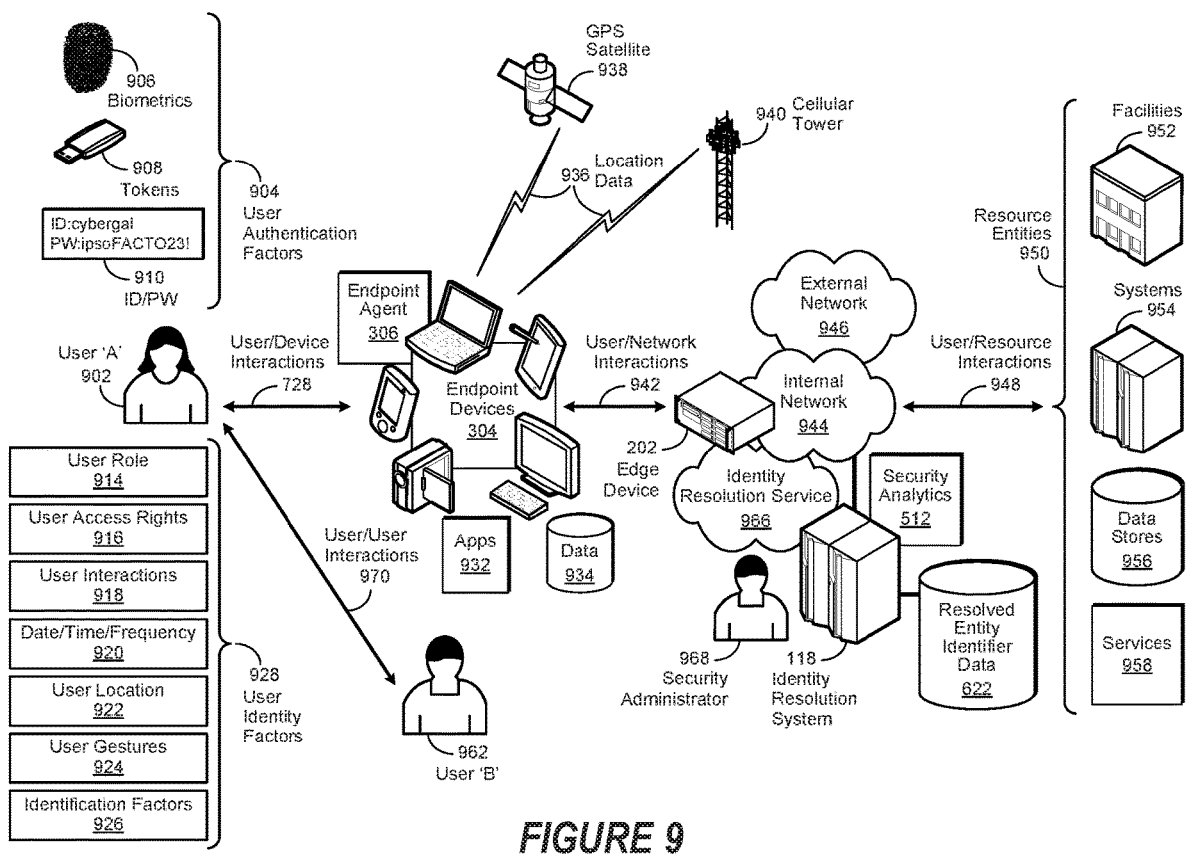
FIG. 9 is a simplified block diagram of the operation of an identity resolution system.

FIG. 9 is a simplified block diagram of the operation of an identity resolution system implemented in accordance with an embodiment of the invention. In certain embodiments, an identity resolution system 118 may be implemented to provide real-time resolution of the identity of an entity at a particular point in time. As used herein, an entity broadly refers to something that exists as itself, whether physically or abstractly. In certain embodiments, an entity may be an individual user, a group, an organization, or a government. In certain embodiments, an entity may likewise be an item, a device, such as endpoint 304 and edge 202 devices, a network, such as an internal 944 and external 946 networks, a domain, an operation, or a process. In certain embodiments, an entity may be a resource 950, such as a geographical location or formation, a physical facility 952, a venue, a system 954, a datastore 956, or a service 958, such as a service 958 operating in a cloud environment.

In certain embodiments, the identity resolution system 118 may be implemented to process certain entity information associated with providing real-time resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications, described in greater detail herein.

In certain embodiments, the identity resolution system 118 may be implemented to use entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 904, user identity factors 912, location data 936, information associated with various endpoint 304 and edge 202 devices, internal 944 and external 946 networks, resource entities 950, or a combination thereof.

In certain embodiments, the user authentication factors 904 may include a user's biometrics 906, an associated security token 908, (e.g., a dongle containing cryptographic keys), or a user identifier/password (ID/PW) 910. In certain embodiments, the user identity factors 912 may include the user's role 914 (e.g., title, position, responsibilities, etc.), the user's access rights 916, the user's interactions 918, and the date/time/frequency 920 of those interactions 918. In certain embodiments, the user identity factors 912 may likewise include the user's location 922 when the interactions 918 are enacted, and the gestures 924 used to enact the interactions 918. In certain embodiments, the user gestures 924 may include key strokes on a keypad, a cursor movement, a mouse movement or click, a finger swipe, tap, or other hand gesture, an eye movement, or some combination thereof. In certain embodiments, the user gestures 924 may likewise include the cadence of the user's keystrokes, the motion, force and duration of a hand or finger gesture, the rapidity and direction of various eye movements, or some combination thereof. In certain embodiments, the user gestures 924 may include various audio or verbal commands performed by the user.

In certain embodiments, the user identification factors 926 may likewise include information, personality type information, technical skill level, financial information, location information, peer information, social network information, or a combination thereof. The user identification factors 926 may likewise include expense account information, paid time off (PTO) information, data analysis information, personally sensitive information (PSI), personally identifiable information (PH), or a combination thereof. Likewise, the user identification factors 926 may include insider information, misconfiguration information, third party information, or a combination thereof.

In certain embodiments, the endpoint device 304 may be configured to receive location data 936, which is used as a data source for determining the user's location 922. In certain embodiments, the location data 936 may include Global Positioning System (GPS) data provided by a GPS satellite 938. In certain embodiments, the location data 936 may include location data 936 provided by a wireless network, such as from a cellular network tower 940. In certain embodiments (not shown), the location data 936 may include various Internet Protocol (IP) or other network address information assigned to the endpoint 304 or edge 202 device. In certain embodiments (also not shown), the location data 936 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 952 or system 954. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, accessing a system, and entering a physical facility 952. Other examples of temporal events include uploading, transferring, downloading, modifying, or deleting data, such as data stored in a datastore 956. Yet other examples of temporal events include interactions between two or more users 960, interactions between a user and a device 928, interactions between a user and a network 942, and interactions between a user and a resource 948, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the identity resolution system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 928, a user/network 942, a user/resource 948, a user/user 970 interaction, or combination thereof.

As an example, user 'A' 902 may use an endpoint device 304 to browse a particular web page on a news site on the Internet. In this example, the individual actions performed by user 'A' 202 to access the web page are user behavior elements that constitute a user behavior. As another example, user 'A' 902 may use an endpoint device 304 to download a data file from a particular system 954. In this example, the individual actions performed by user 'A' 902 to download the data file, including the use of one or more user authentication factors 904 for user authentication, are user behavior elements that constitute a user behavior. In certain embodiments, the user/device 928 interactions may include an interaction between a user, such as user 'A' 902 or 'B' 962, and an endpoint device 304.

In certain embodiments, the user/device 928 interaction may include interaction with an endpoint device 304 that is not connected to a network at the time the interaction occurs. As an example, user 'A' 902 or 'B' 962 may interact with an endpoint device 304 that is offline, using applications 932, accessing data 934, or a combination thereof, it may contain. Those user/device 928 interactions, or their result, may be stored on the endpoint device 304 and then be accessed or retrieved at a later time once the endpoint device 304 is connected to the internal 944 or external 946 networks.

In certain embodiments, the endpoint device 304 may be used to communicate data through the use of an internal network 944, an external network 946, or a combination thereof. In certain embodiments, the internal 944 and the external 946 networks may include a public network, such as the Internet, a physical private network, a virtual private network (VPN), or any combination thereof. In certain embodiments, the internal 944 and external 946 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 948 interactions may include interactions with various resources 950. In certain embodiments, the resources 750 may include various facilities 952 and systems 954, either of which may be physical or virtual, as well as datastores 956 and services 958. In certain embodiments, the user/user 960 interactions may include interactions between two or more users, such as user 'A' 902 and 'B' 962. In certain embodiments, the user/user interactions 960 may be physical, such as a face-to-face meeting, via a user/device 928 interaction, a user/network 942 interaction, a user/resource 948 interaction, or some combination thereof.

In certain embodiments, the user/user 960 interaction may include a face-to-face verbal exchange between two users. In certain embodiments, the user/user 960 interaction may include a written exchange, such as text written on a sheet of paper, between two users. In certain embodiments, the user/user 960 interaction may include a face-to-face exchange of gestures, such as a sign language exchange, between two users. In certain embodiments, temporal event information associated with various interactions 928, 942, 948, 960 may be collected and used to provide real-time resolution of the identity of an entity at a particular point in time. Those of skill in the art will recognize that many such examples of user/device 928, user/network 942, user/resource 948, and user/user 960 interactions are possible. Accordingly, the foregoing is not intended to limit the spirit, scope or intent of the invention.

In certain embodiments, the identity resolution system 118 may be implemented to process certain contextual information, as described in greater detail herein, to ascertain the identity of an entity at a particular point in time. In certain embodiments, the identity resolution system 118 may be implemented to use information associated with such temporal resolution of an entity's identity to assess the risk associated with a particular entity, at a particular point in time, and adaptively respond with an associated response. In certain embodiments, the identity resolution system 118 may be implemented to respond to such assessments in order to reduce operational overhead and improve system efficiency while maintaining security integrity. In certain embodiments, the response to such assessments may be performed by a security administrator 968. Accordingly, certain embodiments of the invention may be directed towards assessing the risk associated with the affirmative resolution of the identity of an entity at a particular point in time in combination with its associated contextual information. Consequently, the identity resolution system 118 may be more oriented in various embodiments to risk adaptation than to security administration.

In certain embodiments, the identity resolution system 118 may be implemented as a stand-alone system. In certain embodiments, the identity resolution system 118 may be implemented as a distributed system. In certain embodiment, the identity resolution system 118 may be implemented as a virtual system, such as an instantiation of one or more virtual machines (VMs). In certain embodiments, the user behavior monitoring system 118 may be implemented as an identity resolution system service 966. In certain embodiments, the identity resolution system service 966 may be implemented in a cloud environment familiar to those of skill in the art. Those of skill in the art will recognize that many such embodiments are possible. Accordingly, the foregoing is not intended to limit the spirit, scope or intent of the invention.

In certain embodiments, temporal identity resolution operations are initiated with the receipt of entity identifier information, which is then parsed to generate unclassified entity identifier elements, which are in turn classified and normalized, as described in greater detail herein. The resulting classified and normalized entity identifier elements are then associated according to their respective relationships.

A normalized entity identifier element is then selected, followed by a determination being made whether it matches any other normalized entity identifier element stored in the repository of resolved entity identifier data 616. If not, then the normalized entity identifier element and its associated classified entity identifier element are processed to generate a resolved entity. Otherwise, the normalized entity identifier elements that match, and their associated classified entity identifier elements, are processed to generate a further resolved entity. The resulting resolved, or further resolved, entity is then added to the repository of resolved entity identifier data 616 and the process is continued until all normalized entity identifier elements have been resolved to their respective entities.

Figure 10:
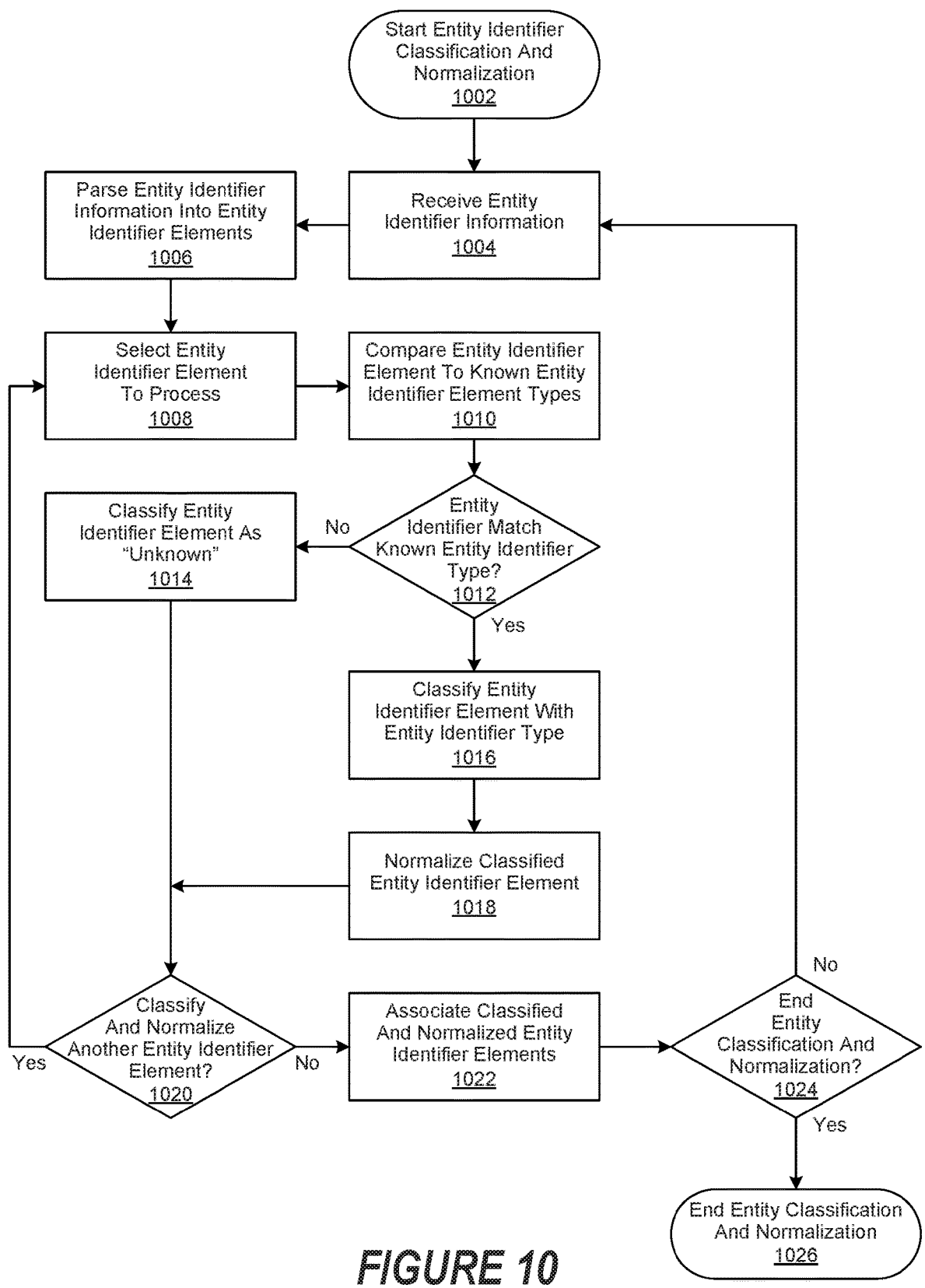
FIG. 10 is a simplified flowchart of the performance of entity identifier element type classification and normalization operations.

FIG. 10 is a simplified flowchart of the performance of entity identifier element type classification and normalization operations implemented in accordance with an embodiment of the invention. In this embodiment, entity identifier element classification and normalization operations are begun in step 1002, followed by the receipt of entity identifier information in step 1004. The entity identifier information is then parsed, as described in greater detail herein, in step 1006 to generated entity identifier elements.

One of the resulting entity identifier elements is selected in step 808, followed by the performance of comparison operations in step 1010 to compare it to known entity identifier element types. A determination is then made in step 1012 whether the selected entity identifier element matches any known entity identifier element types. In certain embodiments, the determination of whether the selected entity identifier element matches any known entity identifier element types may be accomplished through the use of one or more entity identifier element classification rules, described in greater detail herein.

If it was determined in step 1012 that the entity identifier element does not match any known entity identifier element types, then the selected entity identifier element is classified with an entity identifier element type of "unknown" in step 1014. Otherwise, the selected entity identifier element is classified with the known entity identifier element type it matches in step 1016. Once classified, the entity identifier element is normalized, as described in greater detail herein, in step 1018. In certain embodiments, the entity identifier element is normalized through the use of one or more entity identifier element normalization rules, described in greater detail herein.

Thereafter, or once the entity identifier element classification operations are completed in step 1014, a determination is made in step 1020 whether to perform classification and normalization operations on another entity identifier element. If so, then the process is continued, proceeding with step 1008. Otherwise, classified and normalized entity identifier elements that are related to one another are associated, as described in greater detail herein, in step 1022. A determination is then made in step 1024 whether to end of entity identifier element type classification and normalization operations. If not, then the process is continued, proceeding with step 1004. Otherwise, of entity identifier element type classification and normalization operations are ended in step 1026.

Figure 11A:
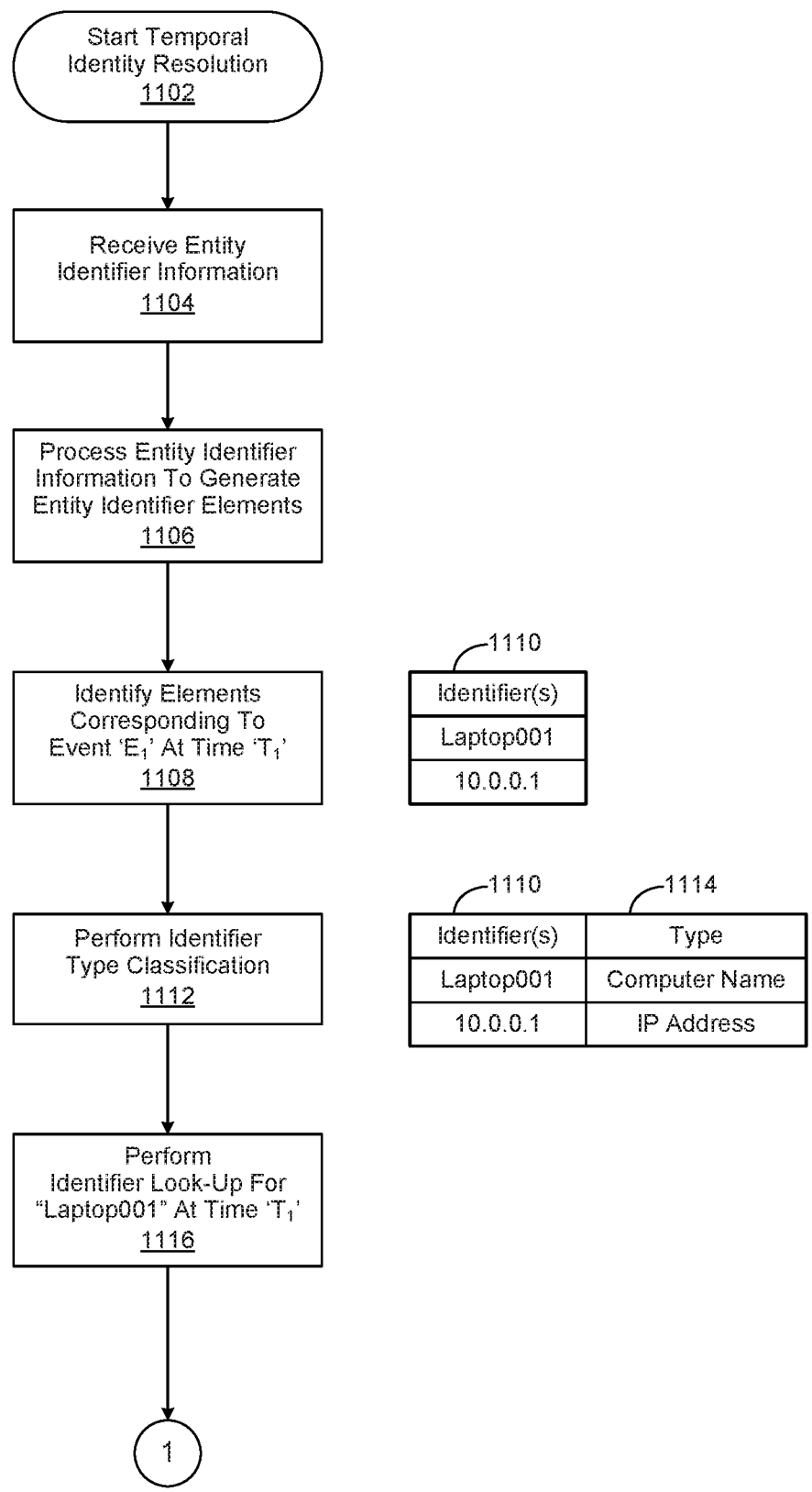
FIGS. 11a and 11b are a simplified process flow of the performance of operations to temporally resolve the identity of an individual entity at a particular point in time.
Figure 11B:
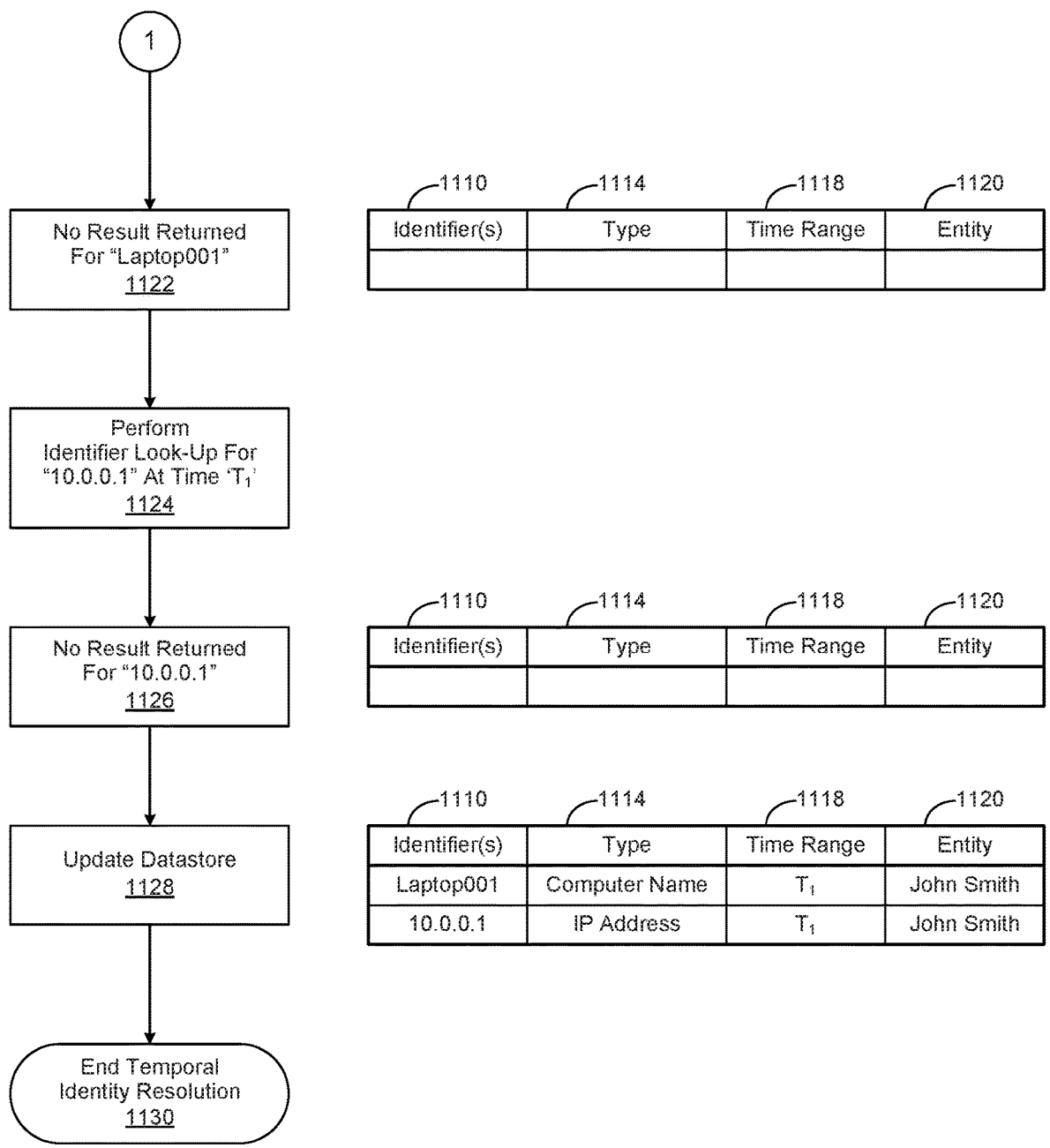

FIGS. 11a and 11b are a simplified process flow of the performance of operations implemented in accordance with an embodiment of the invention to temporally resolve the identity of an individual entity at a particular point in time. In this embodiment, temporal identity resolution operations are begun in step 1102, followed by the receipt of entity identifier information in step 1104. In certain embodiments, the entity identifier information may be received from an endpoint agent, an endpoint device, an edge device, an internal or external network, a physical or virtual resource, or some combination thereof.

As an example, an edge device may intentionally reassign an IP address of 100.0.1 to an entity identified as "Laptop001" at time $T_1$, which would constitute a corresponding event $E_1$. In certain embodiments, entity identifier information that contains temporal information may not be provided as the event is occurring. To continue the example, while the edge device may reassign an IP address of "10.0.0.1" to the entity identified as "Laptop001" at time $T_1$, the entity identifier information associated with event $E_1$ may not be provided when it occurred.

In certain embodiments, entity identifier information that contains temporal information may be provided after the event has occurred. To continue using the previous example, an endpoint agent may send a report or summary to the identity resolution system at some later time $T_2$ indicating that the entity identified as "Laptop001" is using the IP address "10.0.0.1." Consequently, the identity resolution system may determine the entity identified as "Laptop001" and the IP address of "10.0.0.1" are associated at time $T_2$, which is when it received the report or summary from the endpoint agent. Accordingly, the identity resolution system may likewise infer that the IP address of "10.0.0.1" was associated with the entity identified as "Laptop001" at time $T_1$ unless there is evidence to the contrary.

The entity identifier information is then processed in step 1106, as described in greater detail herein, to generate entity identifier elements corresponding to a temporal event $E_1$ occurring at time $T_1$. The resulting entity identifier elements corresponding to the temporal event $E_1$ occurring time $T_1$ are then processed in step 1108 to identify associated entity identifier elements 1110 "Laptop001" and "10.0.0.1."

The identified entity identifier elements 1110 "Laptop001" and "10.0.0.1" are then processed in step 1112 to determine their respective entity identifier element types 1114 of "computer name" and "IP Address." Datastore look-up operations are then performed in step 1116 to search for the entity identifier element 1110 "Laptop001" with an associated entity identifier element type 1114 of "computer name." As shown in FIG. 11b, the outcome of the datastore look-up operations is a null result in step 1122 for entity identifier elements 1110, entity identifier element type 1114, time range 1118, and entity 1120.

Datastore look-up operations are then performed in step 1124 to search for entity identifier element 1110 "10.0.0.1" with an associated entity identifier element type 1114 of "IP address." As shown in FIG. 11b, the outcome of the datastore look-up operations are a null result in step 1126 for entity identifier elements 1110, entity identifier element type 1114, time range 1116, and entity 1120. Accordingly datastore update operations are performed in step 1128 to update entity identifier elements 1110 "Laptop001" and "10.0.0.1," which are respectively associated with entity identifier element types 1114 of "computer name" and "IP address" with time range 1116 values of "$T_1$" and entity 1118 values of "John Smith." Temporal identity resolution operations are then ended in step 1130. From the foregoing, skilled practitioners of the art will recognize performance of the temporal identity resolution operations results in the resolution of the identity of the entity 1120 "John Smith" at, or during, time range 1116 $T_1$.

Figure 12A:
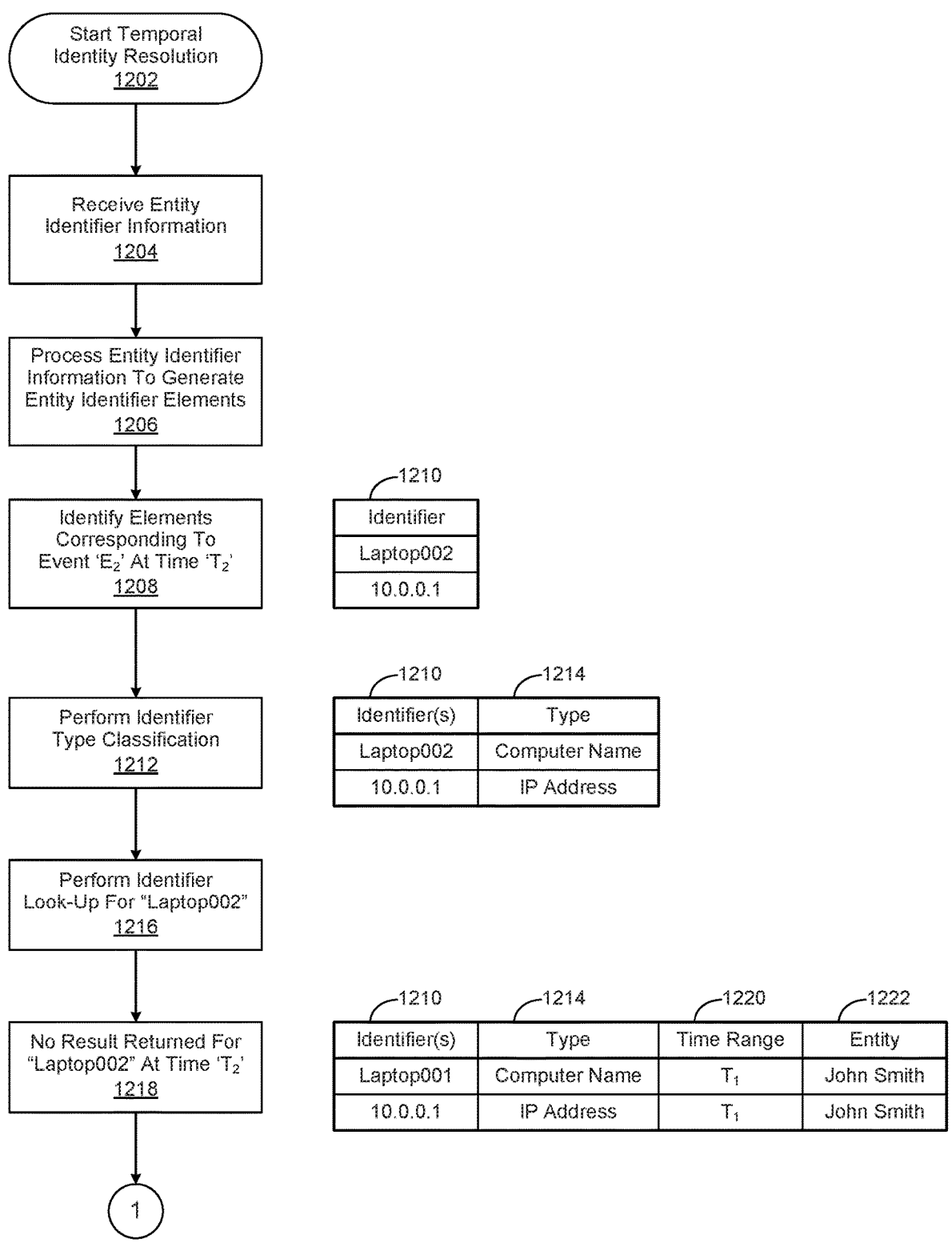
FIGS. 12a and 12b are a simplified process flow of the performance of operations to temporally resolve the identity of two entities at different points in time.
Figure 12B:
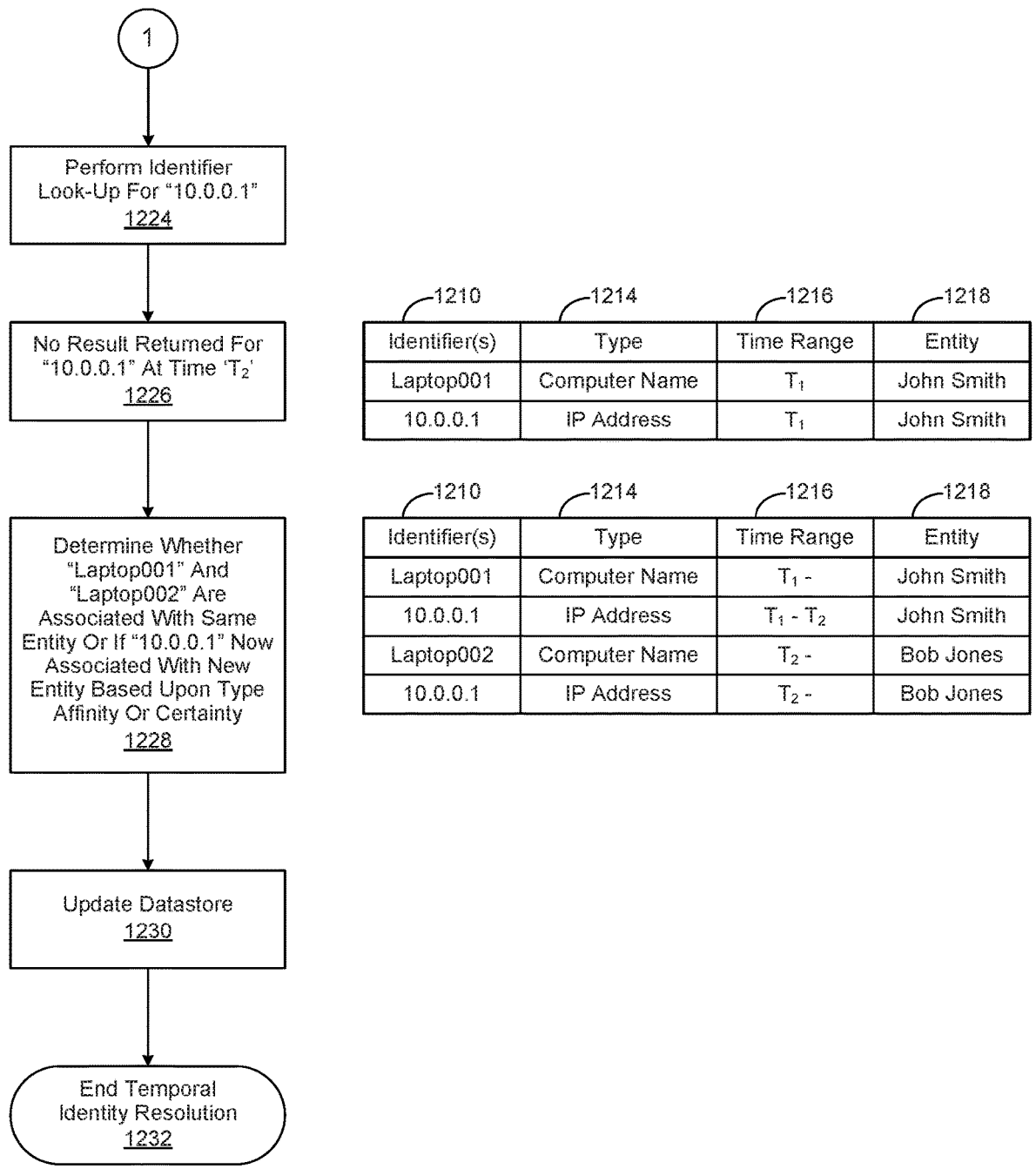

FIGS. 12a and 12b are a simplified process flow of the performance of operations implemented in accordance with an embodiment of the invention to temporally resolve the identity of two entities at different points in time. In this embodiment, temporal identity resolution operations are begun in step 1202, followed by the receipt of entity identifier information in step 1204. In certain embodiments, the entity identifier information may be received from an endpoint agent, an endpoint device, an edge device, an internal or external network, a physical or virtual resource, or some combination thereof. The entity identifier information is then processed in step 1206, as described in greater detail herein, to generate entity identifier elements corresponding to a temporal event $E_2$ occurring at time $T_2$. The resulting entity identifier elements corresponding to the temporal event $E_2$ occurring at time $T_2$ are then processed in step 1208 to identify associated entity identifier elements 1210 "Laptop002" and "10.0.0.1."

The identified entity identifier elements 1210 "Laptop002" and "10.0.0.1" are then processed in step 1212 to determine their respective entity identifier element types 1214 of "computer name" and "IP Address." Datastore look-up operations are then performed in step 1216 to search for entity identifier element 1210 "Laptop002" with an associated entity identifier element type 1214 of "computer name." As shown in FIG. 12a, the datastore only contains entity identifier elements 1210 "Laptop001" and "10.0.0.1," which are respectively associated with entity identifier element types 1214 of "computer name" and "IP address," as well as time range 1216 values of "$T_1$" and entity 1218 values of "John Smith.". More particularly, there are no identifier elements 1210 for "Laptop002," nor are there any time range 1216 values of "$T_2$." Accordingly, the outcome of the datastore look-up operations is a null result in step 1218 for entity identifier elements 1210, entity identifier element type 1214, time range 1218, and entity 1220

Datastore look-up operations are then performed in step 1224 to search for entity identifier element 1210 "10.0.0.1" with an associated entity identifier element type 1214 of "IP address." As before, the datastore only contains entity identifier elements 1210 "Laptop001" and "10.0.0.1," which are respectively associated with entity identifier element types 1214 of "computer name" and "IP address," as well as time range 1216 values of "$T_1$" and entity 1218 values of "John Smith." More particularly, while the datastore contains an entity identifier element 1210 "10.0.0.1" with an associated entity identifier element type 1214 of "IP address," it has an associated time range 914 value of "$T_1$", not "$T_2$." Consequently, the outcome of the datastore look-up operations is a null result in step 1226 for entity identifier elements 1210, entity identifier element type 1214, time range 1218, and entity 1220.

Temporal identity resolution operations are then performed in step 1228 to determine whether the entity identifier elements 1210 of "Laptop001" and "Laptop002" are associated with the same entity or whether the entity identifier element 1210 of "10.0.0.1" is associated with a new entity. In certain embodiments, the determination is made according to entity identifier type affinity, certainty, or a combination thereof. For example, as shown in FIG. 12b, performance of the temporal identity resolution operations may result in determining by affinity that entity identifier elements 1210 "Laptop002" and "10.0.0.1," which are respectively associated with entity identifier element types 1214 of "computer name" and "IP address," are likewise associated with a time range 1216 value of "$T_2$" and an entity 1218 value of "Bob Jones."

Accordingly, it can further be determined with certainty that the entity referred to as "Bob Jones" is not associated with a computer referred to as "Laptop001" at time $T_1$. Instead, the entity referred to as "Bob Jones" is associated with a computer referred to as "Laptop002" at time $T_2$. Moreover, it can be determined with certainty that the entity referred to as "John Smith" was associated with the IP address of "10.0.0.1" from time T1 through time T2, and the entity referred to as "Bob Jones" was associated with the IP address of "10.0.0.1" thereafter. The datastore is then updated accordingly in step 1230 and temporal identity resolution operations are ended in step 1232.

Figure 13:
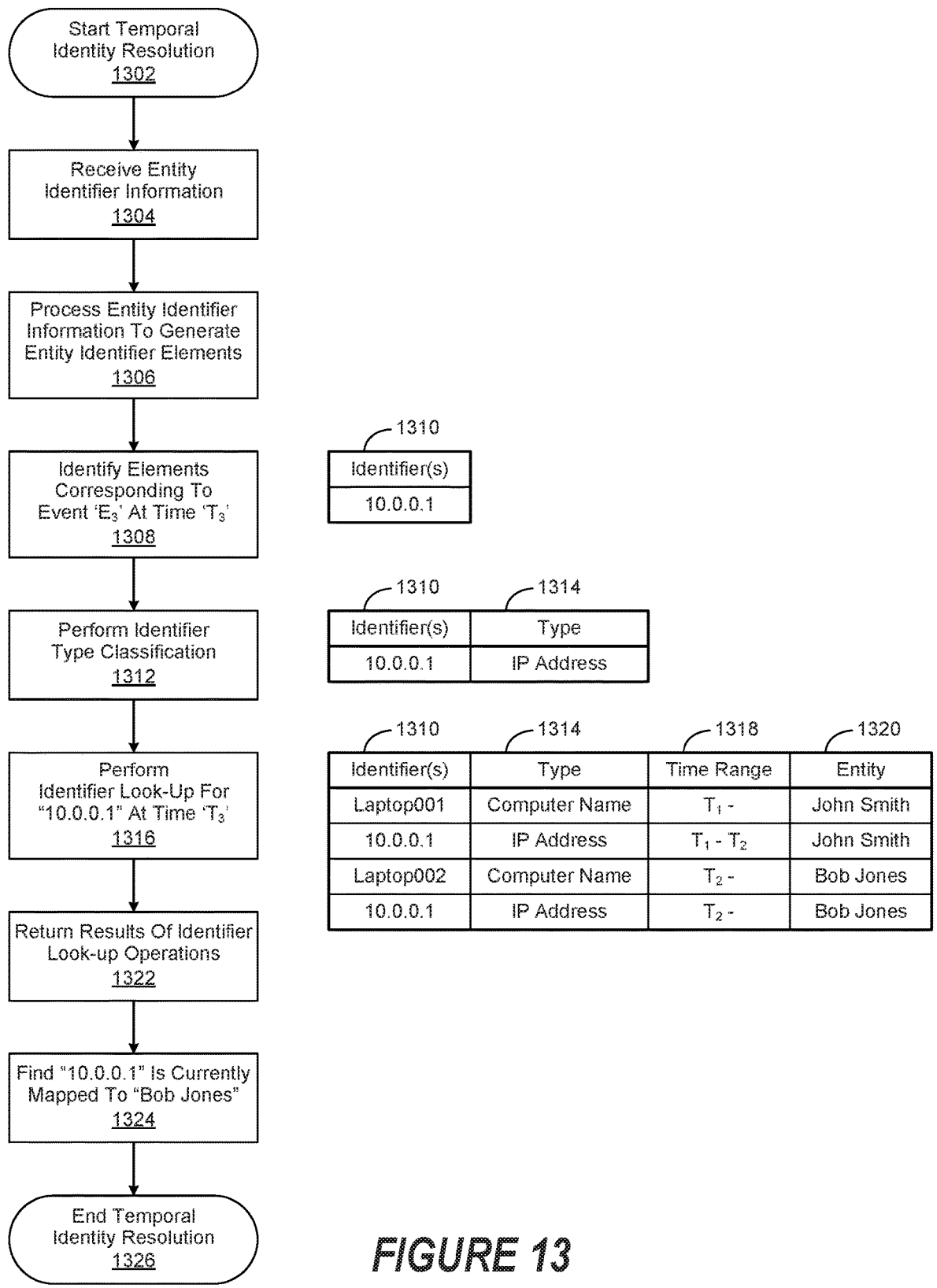
FIG. 13 is a simplified process flow of the performance of operations to temporally resolve the identity of an entity associated with a corresponding entity identifier at a particular point in time.

FIG. 13 is a simplified process flow of the performance of operations implemented in accordance with an embodiment of the invention to temporally resolve the identity of an entity associated with a corresponding entity identifier at a particular point in time. In this embodiment, temporal identity resolution operations are begun in step 1302, followed by the receipt of entity identifier information in step 1304. In certain embodiments, the entity identifier information may be received from an endpoint agent, an endpoint device, an edge device, an internal or external network, a physical or virtual resource, or some combination thereof. The entity identifier information is then processed in step 1306, as described in greater detail herein, to generate entity identifier elements corresponding to a temporal event $E_3$ occurring at time $T_3$. The resulting entity identifier elements corresponding to the temporal event $E_3$ occurring at time $T_3$ are then processed in step 1308 to identify the associated entity identifier element 1308 "10.0.0.1."

The identified entity identifier element 1310 "10.0.0.1" is then processed in step 1310 to determine its entity identifier element type 1314 of "IP Address." Datastore look-up operations are then performed in step 1316 to search for entity identifier element 1310 "10.0.0.1" with an associated entity identifier element type 1314 of "IP Address." As shown in FIG. 13, while the datastore contains entity identifier elements 1108 "10.0.0.1" associated with entity identifier element types 1314 of "IP address," they are only associated with time range 1316 values of "$T_1$" and "$T_2$". More particularly, none of the entity identifier elements 1310 "10.0.0.1" associated with entity identifier element types 1314 of "IP address" are likewise associated with time range 1316 values of "$T_3$". Accordingly, the results of the datastore look-up operations are returned in step 1322 and then used in the performance of temporal entity resolution operations in step 1324 to determine that the IP address "10.0.0.1" is currently mapped to the entity referred to as "Bob Jones," and has been since time $T_2$. Temporal identity resolution operations are then ended in step 1326.

Figure 14:
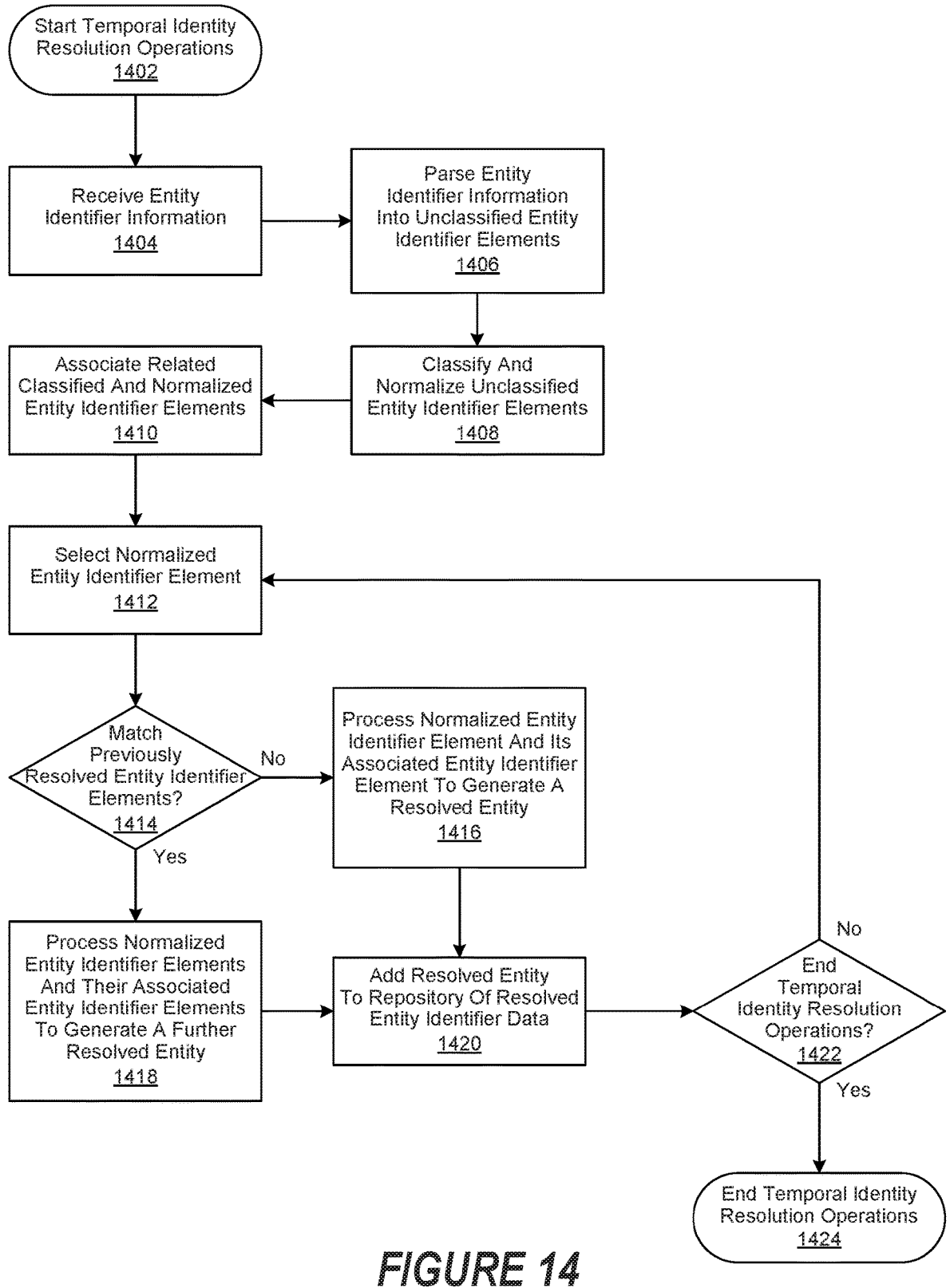
FIG. 14 is a generalized flowchart of the performance of operations for providing real-time resolution of the identity of an entity at a particular point in time.

FIG. 14 is a generalized flowchart of the performance of operations implemented in accordance with an embodiment of the invention for providing real-time resolution of the identity of an entity at a particular point in time. In this embodiment, temporal identity resolution operations are begun in step 1402, followed by the receipt of entity identifier information, described in greater detail herein, in step 1404. The entity identifier information is then parsed in step 1406, as likewise described in greater detail herein, to generate unclassified entity identifier elements.

The resulting unclassified entity identifier elements are then classified and normalized in step 1408, followed by the association of related classified and normalized entity identifier elements in step 1410. A normalized entity identifier element is then selected in step 1412, followed by a determination being made in step 1414 whether the selected normalized entity identifier elements matches any other normalized entity identifier element stored in a repository of resolved entity identifier data. If not, then the normalized entity identifier element and its associated classified entity identifier element are processed in step 1416 to generate a resolved entity. Otherwise, the normalized entity identifier elements that match, and their associated classified entity identifier elements, are processed in step 1418 to generate a further resolved entity.

Thereafter, or once the resolved entity is generated in step 1420, the resulting resolved, or further resolved, entity is added to the repository of resolved entity identifier data in step 1420. A determination is made in step 1422 whether to end temporal identity resolution operations. If not, then the process is continued, proceeding with step 1412. Otherwise, temporal identity resolution operations are ended in step 1424.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implementable method for resolving an identity of an entity, comprising:
   receiving a stream of events from a protected endpoint, the stream of events comprising a plurality of events, the protected endpoint comprising an endpoint agent executing on an endpoint device, the endpoint agent requiring the endpoint device to comply with particular criteria before being granted access to network resources, the protected endpoint providing a policy-based approach to network security;
   parsing entity identifier information associated with the entity from the stream of events to provide an entity identifier element, the entity identifier information comprising temporal information;
   classifying the entity identifier element by type to provide a classified entity identifier element, the classified entity identifier element comprising an entity identifier element type, the entity identifier element type providing a representation of a particular attribute associated with the entity identifier element;
   normalizing the classified entity identifier element to provide a classified and normalized entity identifier element, the classified and normalized entity identifier element comprising a type-dependent normalized entity identifier element;
   associating the classified and normalized entity identifier element and the temporal information with the entity in real time to resolve the identity of the entity at a particular point in time, the associating determining whether the classified and normalized entity identifier element matches a known entity identifier element type for the particular point in time in a repository of resolved entity identifier data;
   storing the resolved identity of the entity in the repository of resolved entity identifier data;
   performing a security analysis operation, the security analysis operation using the resolved identity of the entity at the particular point in time to assess a risk associated with the entity; and
   responding with an associated response based on the accessed risk associated with the entity.

2. The computer-implementable method of claim 1, wherein:
   the temporal information is associated with an event of the plurality of events associated with a particular point in time.

3. The computer-implementable method of claim 1, wherein:
   the temporal information comprises temporal event information, the temporal event information being associated with a particular event of the plurality of events.

4. The computer-implementable method of claim 3, wherein:
   the temporal event information comprises content, the content comprising at least one of text, unstructured data, structured data, a graphical image, a photograph, an audio recording, and a video recording.

5. The computer-implementable method of claim 4, wherein:
   the temporal event information comprises metadata associated with the content, the metadata comprising a temporal event attribute for the content.

6. The computer-implementable method of claim 1, wherein:
   the normalizing provides an implicit identifier pair associated with the normalized entity identifier element.

7. A system comprising:
   a processor;
   a data bus coupled to the processor; and
   a non-transitory, computer-readable storage medium embodying computer program code for resolving an identity of an entity, the non-transitory, computer-readable storage medium being coupled to the data bus, the computer program code interacting with a plurality of computer operations and comprising instructions executable by the processor and configured for:
      receiving a stream of events from a protected endpoint, the stream of events comprising a plurality of events, the protected endpoint comprising an endpoint agent executing on an endpoint device, the endpoint agent requiring the endpoint device to comply with particular criteria before being granted access to network resources, the protected endpoint providing a policy-based approach to network security;
      parsing entity identifier information associated with the entity from the stream of events to provide an entity identifier element, the entity identifier information comprising temporal information;
      classifying the entity identifier element by type to provide a classified entity identifier element, the classified entity identifier element comprising an entity identifier element type, the entity identifier element type providing a representation of a particular attribute associated with the entity identifier element;
      normalizing the classified entity identifier element to provide a classified and normalized entity identifier element, the classified and normalized entity identifier element comprising a type-dependent normalized entity identifier element;
      associating the classified and normalized entity identifier element and the temporal information with the entity in real time to resolve the identity of the entity at a particular point in time, the associating determining whether the classified and normalized entity identifier element matches a known entity identifier element type for the particular point in time in a repository of resolved entity identifier data;
      storing the resolved identity of the entity in the repository of resolved entity identifier data;
      performing a security analysis operation, the security analysis operation using the resolved identity of the entity at the particular point in time to assess a risk associated with the entity; and,
      responding with an associated response based on the accessed risk associated with the entity.

8. The system of claim 7, wherein:
   the temporal information is associated with an event of the plurality of events associated with a particular point in time.

9. The system of claim 7, wherein:
   the temporal information comprises temporal event information, the temporal event information being associated with a particular event of the plurality of events.

10. The system of claim 9, wherein:
    the temporal event information comprises content, the content comprising at least one of text, unstructured data, structured data, a graphical image, a photograph, an audio recording, and a video recording.

11. The system of claim 10, wherein:
the temporal event information comprises metadata associated with the content, the metadata comprising a temporal event attribute for the content.

12. The system of claim 7, wherein:
the normalizing provides an implicit identifier pair associated with the normalized entity identifier element.

13. A non-transitory, computer-readable storage medium embodying computer program code for resolving an identity of an entity, the computer program code comprising computer executable instructions configured for:
receiving a stream of events from a protected endpoint, the stream of events comprising a plurality of events, the protected endpoint comprising an endpoint agent executing on an endpoint device, the endpoint agent requiring the endpoint device to comply with particular criteria before being granted access to network resources, the protected endpoint providing a policy-based approach to network security;
parsing entity identifier information associated with the from the stream of events entity to provide an entity identifier element, the entity identifier information comprising temporal information;
classifying the entity identifier element by type to provide a classified entity identifier element, the classified entity identifier element comprising an entity identifier element type, the entity identifier element type providing a representation of a particular attribute associated with the entity identifier element;
normalizing the classified entity identifier element to provide a classified and normalized entity identifier element, the classified and normalized entity identifier element comprising a type-dependent normalized entity identifier element;
associating the classified and normalized entity identifier element and the temporal information with the entity in real time to resolve the identity of the entity at a particular point in time, the associating determining whether the classified and normalized entity identifier element matches a known entity identifier element type for the particular point in time in a repository of resolved entity identifier data;
storing the resolved identity of the entity in the repository of resolved entity identifier data;
performing a security analysis operation, the security analysis operation using the resolved identity of the entity at the particular point in time to assess a risk associated with the entity; and,
responding with an associated response based on the accessed risk associated with the entity.

14. The non-transitory, computer-readable storage medium of claim 13, wherein:
the temporal information is associated with an event of the plurality of events associated with a particular point in time.

15. The non-transitory, computer-readable storage medium of claim 13, wherein:
the temporal information comprises temporal event information, the temporal event information being associated with a particular event of the plurality of events.

16. The non-transitory, computer-readable storage medium of claim 15, wherein:
the temporal event information comprises content, the content comprising at least one of text, unstructured data, structured data, a graphical image, a photograph, an audio recording, and a video recording.

17. The non-transitory, computer-readable storage medium of claim 16, wherein:
the temporal event information comprises metadata associated with the content, the metadata comprising a temporal event attribute for the content.

18. The non-transitory, computer-readable storage medium of claim 13, wherein:
the normalizing provides an implicit identifier pair associated with the normalized entity identifier element.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *